United States Patent
Koma et al.

(10) Patent No.: US 12,500,672 B2
(45) Date of Patent: Dec. 16, 2025

(54) OPTICAL RECEIVING APPARATUS AND FREQUENCY OFFSET COMPENSATION METHOD

(71) Applicant: NTT, Inc., Tokyo (JP)

(72) Inventors: Ryo Koma, Musashino (JP); Junichi Kani, Musashino (JP)

(73) Assignee: NTT, Inc., Tokyo (JP)

( * ) Notice: Subject to any disclaimer, the term of this patent is extended or adjusted under 35 U.S.C. 154(b) by 279 days.

(21) Appl. No.: 18/276,985

(22) PCT Filed: Feb. 16, 2021

(86) PCT No.: PCT/JP2021/005644
§ 371 (c)(1),
(2) Date: Aug. 11, 2023

(87) PCT Pub. No.: WO2022/176005
PCT Pub. Date: Aug. 25, 2022

(65) Prior Publication Data
US 2024/0178921 A1    May 30, 2024

(51) Int. Cl.
*H04B 10/61*    (2013.01)
*H04B 10/077*    (2013.01)
(Continued)

(52) U.S. Cl.
CPC ..... *H04B 10/6164* (2013.01); *H04B 10/0775* (2013.01); *H04B 10/40* (2013.01); *H04B 10/63* (2013.01); *H04B 10/65* (2020.05)

(58) Field of Classification Search
None
See application file for complete search history.

(56) References Cited

U.S. PATENT DOCUMENTS

| | | | |
|---|---|---|---|
| 7,209,664 B1 * | 4/2007 | McNicol | H04B 10/64 375/219 |
| 7,522,842 B1 * | 4/2009 | McNicol | H04B 10/2916 398/160 |

(Continued)

FOREIGN PATENT DOCUMENTS

WO    WO-2014/112516 A1    7/2014

OTHER PUBLICATIONS

Xian Zhou et al., "Wide-Range Frequency Offset Estimation Algorithm for Optical Coherent Systems Using Training Sequence", IEEE Photonics Technology Letters, vol. 24, No. 1, pp. 82-84, Jan. 1, 2012.

(Continued)

*Primary Examiner* — Darren E Wolf

(57) ABSTRACT

A reception unit, in which a range of an electric band is in a range from $-Be$ to $+Be$ and $Be > B/2$ is satisfied, receives signal light of a symbol rate B generated by optically modulating transmission data, performs digital coherent reception by interfering the received signal light with the local oscillation light generated by the local oscillation light source, converts the signal light into an electric digital signal, and output the digital signal, and a frequency offset compensation unit provided in a digital signal processing unit estimates a frequency offset amount generated in the digital signal in a range of $-B/2$ or more and $+B/2$ or less in accordance with a frequency difference between the signal light and the local oscillation light, and perform frequency offset compensation for the digital signal on the basis of the estimated frequency offset amount to compensate the frequency offset amount in a range of $-B/2$ or more and $+B/2$ or less and compensate so as to remain the frequency offset amount of an integral multiple of the symbol rate B when the (Continued)

frequency offset amount is in a range of less than −B/2 and a range of more than +B/2.

7 Claims, 16 Drawing Sheets

(51) Int. Cl.
  *H04B 10/40* (2013.01)
  *H04B 10/63* (2013.01)

(56) References Cited

U.S. PATENT DOCUMENTS

| | | | | |
|---|---|---|---|---|
| 2010/0142971 | A1* | 6/2010 | Chang | H04B 10/6164 398/208 |
| 2011/0097085 | A1* | 4/2011 | Oda | H04B 10/516 398/65 |
| 2012/0076507 | A1* | 3/2012 | Roberts | H04B 10/64 398/205 |
| 2015/0341138 | A1 | 11/2015 | Ishihara et al. | |

OTHER PUBLICATIONS

Lei Li et al., "Wide-range, Accurate and Simple Digital Frequency Offset Compensator for Optical Coherent Receivers", OFC/NFOEC 2008, paper OWT4.

Ryo Koma et al., "Wide Range Carrier Frequency Offset Estimation Method using Training Symbols with Asymmetric Constellations for Burst-Mode Coherent Reception", OSA (Optical Society of America) Technical Digest (online) (OSA, 2018), paper M3B.5.

Andreas Leven et al., "Frequency Estimation in Intradyne Reception", IEEE Photonics Technology Letters, vol. 19, No. 6, Mar. 15, 2007.

* cited by examiner

OPTICAL RECEIVING APPARATUS AND FREQUENCY OFFSET COMPENSATION METHOD

CROSS-REFERENCE TO RELATED APPLICATIONS

This application is a 371 National Stage of International Application No. PCT/JP2021/005644, filed on Feb. 16, 2021. The entire disclosure of the above application is incorporated herein by reference.

TECHNICAL FIELD

The present invention relates to an optical reception device, and a frequency offset compensation method.

BACKGROUND ART

An optical reception device to which the conventional optical digital coherent reception system is applied receives signal light transmitted by an optical transmission device, and generates beat components of the electric field components of the signal light and the electric field components of the local light by causing the received signal light to interfere with local oscillation light (hereinafter referred to as "local light") generated by the local oscillation light source. When the signal light received by the optical reception device is, for example, the signal light modulated by a polarized wave multiplexing QPSK (Quadrature Phase Shift Keying) system, each of X-polarized wave and Y-polarized wave includes an I (In-phase) component and a Q (Quadrature) component. The optical reception device separates the signal light into the X-polarized wave and the Y-polarized wave, and then generates beat components of the respective polarized waves to detect the I component and the Q component of the X-polarized wave and the I component and the Q component of the Y-polarized wave. The optical reception device photoelectrically converts the generated beat components to generate four analog electric signals corresponding to the I component and the Q component of the X-polarized wave and the I component and the Q component of the Y-polarized wave, respectively.

Each of the four analog electric signals is converted into a digital signal of an electric signal by an ADC (Analog-to-Digital Converter), and the converted digital signal is demodulated into transmission data after its deterioration or the like is compensated by a digital signal processing circuit. Thus, by using the optical digital coherent reception system, the effect of amplification by the local light and the effect of signal quality compensation by the digital signal processing circuit can be obtained, so that the transmission data of high quality can be demodulated.

When the optical digital coherent reception system is used, as shown in FIG. 16 (a), when an interval between the wavelength of the signal light and the wavelength of the local light, that is, a difference between the wavelength of the signal light and the wavelength of the local light exists, phase rotation called a frequency offset and noise are generated in the reception signal received by the optical reception device. Here, the phase rotation by the frequency offset is that, for example, when QPSK modulation is performed in an optical transmission device, as shown in FIG. 16 (b), the phases of four symbols 201, 202, 203, and 204 generated by QPSK modulation are rotated on the IQ plane, and are shifted to the phases of the symbols 201*a*, 202*a*, 203*a*, and 204*a*, respectively.

In order to compensate the frequency offset, a frequency offset compensation circuit is provided in the digital signal processing circuit of the optical reception device, and the frequency offset amount is estimated by using the frequency offset compensation circuit. The frequency offset compensation circuit performs phase rotation in a direction opposite to a rotation direction by the frequency offset on the basis of the estimated frequency offset amount, thereby returning phases of symbols 201*a*, 202*a*, 203*a*, and 204*a* to phases of original symbols 201, 202, 203, and 204 as shown in FIG. 16 (c), so that the deterioration of the signal quality due to the frequency offset can be compensated.

CITATION LIST

Non Patent Literature

[NPL 1] Xian Zhou, Xue Chen. and Keping Long, "Wide-Range Frequency Offset Estimation Algorithm for Optical Coherent Systems Using Training Sequence". IEEE Photonics Technology Letters, VOL. 24, No. 1, pp82-84, Jan. 1, 2012

[NPL 2] Lei Li. Zhenning Tao, Shoichiro Oda, Takeshi Hoshida, and Jens C. Rasmussen, "Wide-range. Accurate and Simple Digital Frequency Offset Compensator for Optical Coherent Receivers", OSA Technical Digest (CD) (Optical Society of America, 2008), paper OWT4

[NPL 3] Ryo Koma, Masamichi Fujiwara, Ryo Igarashi, Takuya Kanai, Jun-ichi Kanai, and Akihiro Otaka, "Wide Range Carrier Frequency Offset Estimation Method using Training Symbols with Asymmetric Constellations for Burst-Mode Coherent Reception", OSA (Optical Society of America) Technical Digest (online) (OSA, 2018), paper M3B.5

SUMMARY OF INVENTION

Technical Problem

In a conventional frequency offset compensation system for an M-PSK modulation system (where M is a multi-value degree and $M=2^k$ is satisfied when k is an integer of 1 or more), for example, as shown in NPLs 1 to 3, a range of the estimated frequency offset amounts is $-B/2$ or more and $+B/2$ or less when a baud rate of the signal light, i.e., a symbol rate is B. Therefore, the range that can be estimated differs in accordance with the symbol rate B.

In an optical transmission system which has been put into practical use in a core network or the like, the system has been constructed on the assumption that the symbol rate B substantially coincides with the electric band Be of the optical reception device. Therefore, the range of the frequency offset amount that can be estimated is sufficient in the range of $-B/2$ or more and $+B/2$ or less.

In recent years, the application of an optical digital coherent reception system to an access network has been progressed. In the access network, economic efficiency is emphasized, and it is expected that a signal having a lower symbol rate than that of a core network is transmitted and received. When the symbol rate becomes low, the range of the estimated frequency offset amount becomes narrow, so that the requirement of frequency stability required for the light source on the optical transmission device side used for generating the signal light becomes severe so as not to generate a large frequency offset, and there is a problem that the cost becomes high.

In view of the above-mentioned circumstances, the present invention aims to provide a technique capable of relaxing the requirement of frequency stability required for a light source on the optical transmission device side used for generating signal light even when the symbol rate B is low, and performing frequency offset compensation at low cost.

Solution to Problem

An embodiment of the present invention is an optical reception device, the optical reception device includes a local oscillation light source that generates local oscillation light, a reception unit that receives signal light of a symbol rate B generated by optically modulating transmission data, performs digital coherent reception by interfering the received signal light with the local oscillation light generated by the local oscillation light source, converts the signal light into an electric digital signal, and output the digital signal, in which a range of an electric band is in a range from −Be to +Be and Be >B/2 is satisfied, and a digital signal processing unit that demodulates the transmission data from the digital signal outputted by the reception unit, wherein the digital signal processing unit includes a frequency offset compensation unit that estimates a frequency offset amount generated in the digital signal in a range of −B/2 or more and +B/2 or less in accordance with a frequency difference between the signal light and the local oscillation light, and perform frequency offset compensation for the digital signal on the basis of the estimated frequency offset amount to compensate a frequency offset amount in the range of −B/2 or more and +B/2 or less and compensate so as to remain a frequency offset amount of an integral multiple of the symbol rate B when the frequency offset amount is in a range of less than −B/2 and a range of more than +B/2.

An aspect of the present invention is a frequency offset compensation method in which a local oscillation light source generates local oscillation light, a reception unit in which a range of an electric band is in a range from −Be to +Be and Be >B/2 is satisfied receives signal light of a symbol rate B generated by optically modulating transmission data, performs digital coherent reception by interfering the received signal light with the local oscillation light generated by the local oscillation light source, converts the signal light into an electric digital signal, and output the digital signal, and a frequency offset compensation unit provided in a digital signal processing unit that demodulates the transmission data from the digital signal outputted by the reception unit estimates a frequency offset amount generated in the digital signal in a range of −B/2 or more and +B/2 or less in accordance with a frequency difference between the signal light and the local oscillation light, and perform frequency offset compensation for the digital signal on the basis of the estimated frequency offset amount to compensate the frequency offset amount in the range of −B/2 or more and +B/2 or less and compensate so as to remain the frequency offset amount of an integral multiple of the symbol rate B when the frequency offset amount is in a range of less than −B/2 and a range of more than +B/2.

Advantageous Effects of Invention

According to the present invention, even when the symbol rate B becomes low, the requirement of frequency stability required for a light source on the optical transmission device side used for generating signal light is relaxed, and frequency offset compensation can be performed at low cost.

DESCRIPTION OF EMBODIMENTS

First Embodiment

Figure 1:
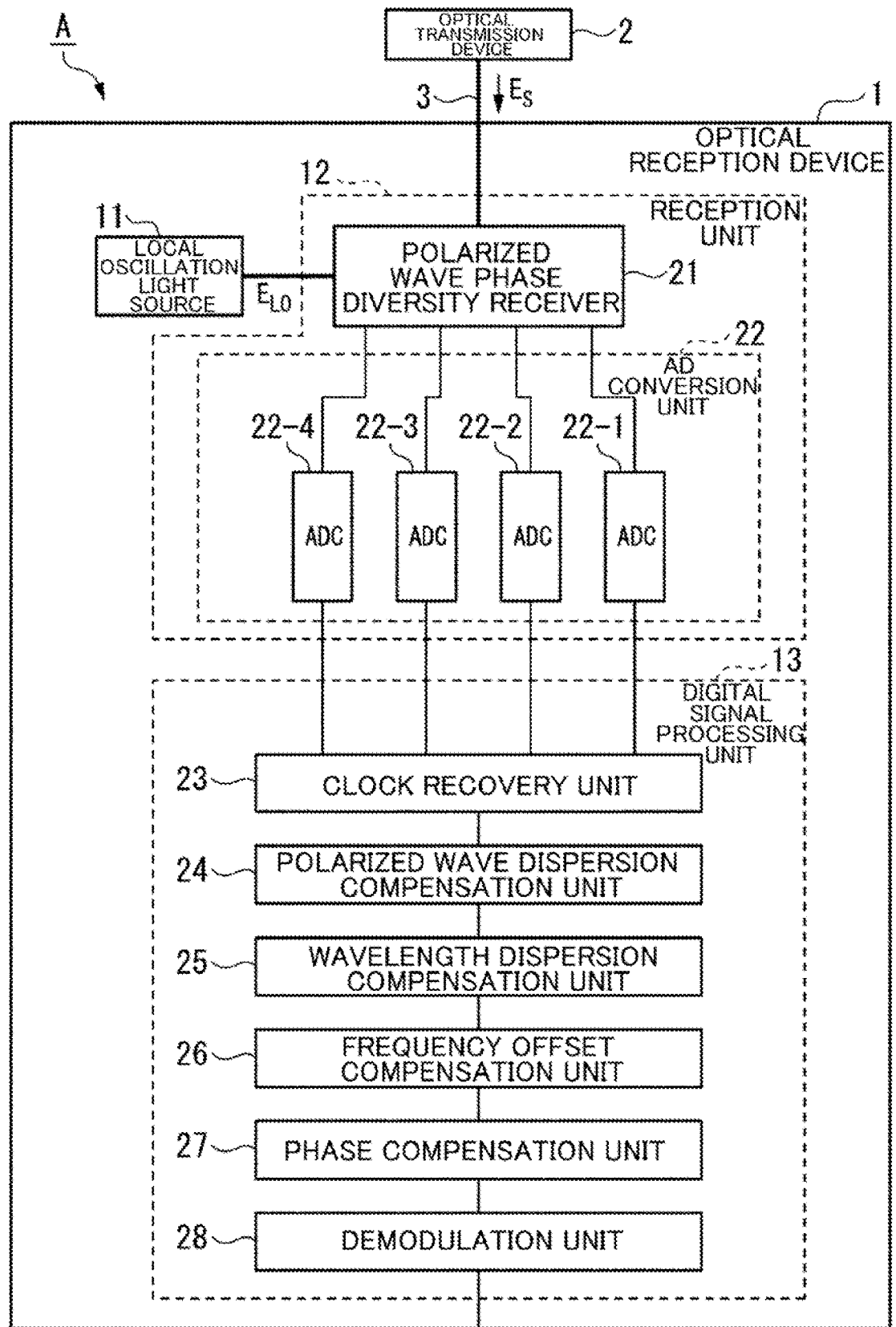
FIG. 1 is a block diagram showing a configuration of an optical transmission system of a first embodiment.

Hereinafter, embodiments of the invention will be described with referring to the accompanying drawings. FIG. 1 is a block diagram showing a configuration of an optical transmission system A according to a first embodiment that is one embodiment of the present invention. In FIG. 1, a connection line indicated by a dashed line is an optical line through which an optical signal propagates, and other connection lines are an electric line through which an electric signal propagates.

The optical transmission system A includes an optical reception device 1 and an optical transmission device 2. The optical reception device 1 and the optical transmission device 2 are connected through an optical transmission line 3. For example, an optical fiber transmission line or the like is applied to the optical transmission line 3. The optical transmission device 2 includes a light source such as an LD (Laser Diode) for generating signal light. The optical transmission device 2 modulates transmission data which is an electric digital signal by, for example, a polarized wave multiplexing QPSK system to generate the signal light, and transmits it to the optical reception device 1 through the optical transmission line 3.

The optical reception device 1 includes a local oscillation light source 11, a reception unit (receiver) 12, and a digital signal processing unit (digital signal processor) 13. The local oscillation light source 11 is, for example, the LD and generates a local signal which is a local oscillation light of a predetermined wavelength λ.

The reception unit 12 includes a polarized wave phase diversity receiver 21 and an AD (Analog-to-Digital) conversion unit 22. The polarized wave phase diversity receiver 21 is connected to the optical transmission line 3, receives signal light of a symbol rate B transmitted by the optical transmission device 2 through the optical transmission line 3, performs digital coherent reception, and converts the received signal light into an electric analog signal.

More specifically, the polarized wave phase diversity receiver 21 separates the received signal light into an X-polarized wave and a Y-polarized wave. The polarized wave phase diversity receiver 21 generates beat components of an electric field component $E_S$ of the signal light and an electric field component $E_{LO}$ of the local signal by interfering each of the separated X-polarized wave and Y-polarized wave with the local signal generated by the local oscillation light source 11. The polarized wave phase diversity receiver 21 detects I and Q components of the X-polarized wave and I and Q components of the Y polarized wave from the generated beat components. The polarized wave phase diversity receiver 21 photoelectrically converts four optical signals corresponding to the I component and the Q component of the detected X-polarized wave and the I component and the Q component of the detected Y-polarized wave to generate four electric analog signals.

The AD conversion unit 22 includes four ADCs 22-1, 22-2, 22-3, and 22-4 corresponding to the I component and Q component of the X-polarized wave and the I component and Q component of the Y-polarized wave, respectively. Each of the ADCs 22-1, 22-2, 22-3, and 22-4 takes in the electric analog signal corresponding to each generated by the polarized wave phase diversity receiver 21, and converts the analog signal taken in into an electric digital signal.

Figure 2:
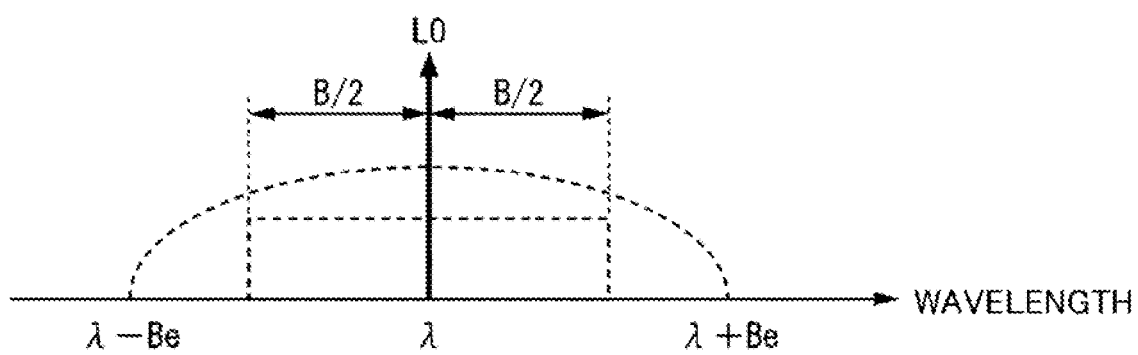
FIG. 2 is a diagram showing a reception band of an optical reception device of the first embodiment.

Here, when the electric band of the reception unit 12 is represented by "Be", the reception band of the reception unit 12 falls within a range from "λ−Be" to "λ+Be" as shown in FIG. 2, in this case, between the electric band Be and the symbol rate B, there is a relationship in which the electric band Be exceeds half of the symbol rate B, i.e., Be >B/2 is satisfied.

The digital signal processing unit 13 includes a clock recovery unit 23, a polarized wave dispersion compensation unit 24, a wavelength dispersion compensation unit 25, a frequency offset compensation unit (frequency offset compensator) 26, a phase compensation unit (phase compensator) 27, and a demodulation unit 28. The clock recovery unit 23 is, for example, a sampling frequency compensation circuit. The clock recovery unit 23 compensates a difference in reference clock between the optical transmission device 2 and the optical reception device 1, for example, a difference in sampling frequency caused by an oscillation frequency error of a crystal oscillator provided in each of the optical transmission device 2 and the optical reception device 1. The clock recovery unit 23 compensates the four digital signals outputted by each of the ADCs 22-1, 22-2, 22-3, and 22-4 and then couples the four digital signals.

The polarized wave dispersion compensation unit 24 compensates a digital signal coupled by the clock recovery unit 23 for polarized wave dispersion generated while propagating through the optical transmission line 3. The wavelength dispersion compensation unit 25 compensates the digital signal subjected to the polarized wave dispersion compensation by the polarized wave dispersion compensation unit 24 for wavelength dispersion generated while propagating through the optical transmission line 3.

The frequency offset compensation unit 26 estimates a frequency offset amount in a range of −B/2 or more and +B/2 or less on the basis of a training symbol sequence included in the digital signal subjected to wavelength dispersion compensation by the wavelength dispersion compensation unit 25. Hereinafter, the frequency offset amount which is estimated is also referred to as an estimated frequency offset amount. The frequency offset compensation unit 26 performs frequency offset compensation on the digital signal on the basis of the estimated frequency offset amount. More specifically, the frequency offset compensation unit 26 performs the frequency offset compensation by applying phase rotation corresponding to the estimated frequency offset amount to each symbol included in the digital signal in a direction opposite to a rotation direction by the frequency offset.

Figure 3:
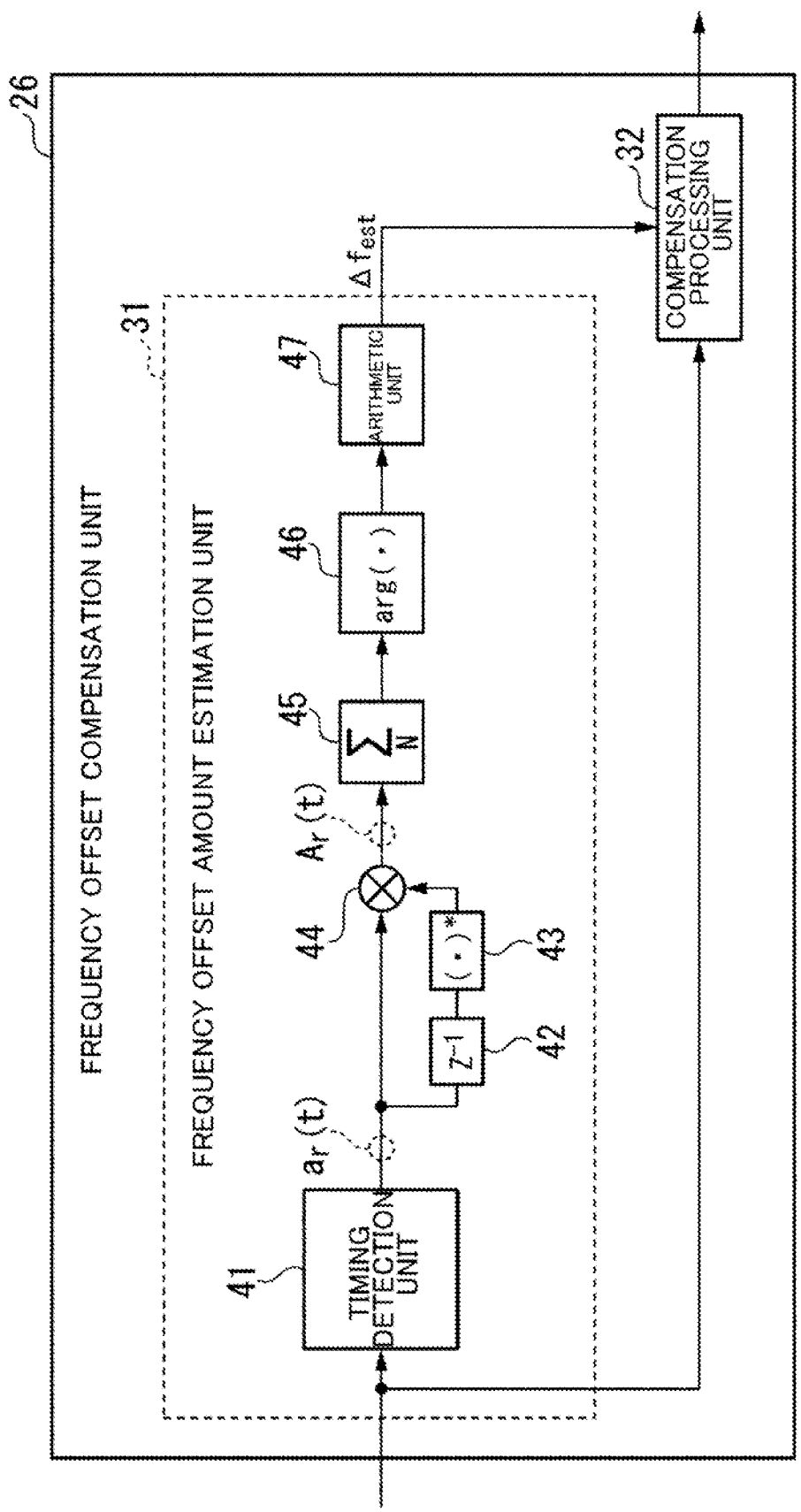
FIG. 3 is a block diagram showing an internal configuration of a frequency offset compensation unit of the first embodiment.

For example, in the case of using the differential detection based method shown in NPL 3, the frequency offset compensation unit 26 has the internal configuration shown in FIG. 3. The frequency offset compensation unit 26 includes a frequency offset amount estimation unit (frequency offset amount estimator) 31, and a compensation processing unit (compensation processor) 32. The frequency offset amount estimation unit 31 includes a timing detection unit 41, a delay unit 42, a complex conjugate unit 43, a multiplier 44, a vector averaging unit 45, a deflector 46, and an arithmetic unit 47.

The digital signal subjected to wavelength dispersion compensation by the wavelength dispersion compensation unit 25 includes a preamble part in which a predetermined training symbol sequence is written, and a payload part following the preamble. A data sequence corresponding to transmission data transmitted by the optical transmission device 2 is written in the payload part. The tinting detection unit 41 detects a head position of the training symbol sequence from the preamble part of the digital signal. The timing detection unit 41 reads the training symbol sequence from the digital signal on the basis of the head position of the detected training symbol sequence and sequentially outputs the training symbol sequence one symbol by one symbol for each symbol period. Hereinafter, the symbol period is represented by "T". Here, T=1/B is satisfied.

The delay unit 42 delays the symbols taken in by one symbol period T and outputs the delayed symbols. The complex conjugate unit 43 generate a complex conjugate of the symbols taken in. The multiplier 44 multiplies the two symbols thus taken in to perform differential detection to calculate a vector. The vector averaging unit 45 calculates a vector average by calculating a sum of N vectors which is a predetermined number. Here, N is the average number of symbols, and is predetermined within a range of sequence length of the training symbol sequence. The deflector 46 calculates a deflection angle of the vector average. The arithmetic unit 47 calculates the estimated frequency offset amount $\Delta f_{est}$ on the basis of the deflection angle of the vector average calculated by the deflector 46.

The compensation processing unit 32 performs the frequency offset compensation on the digital signal on the basis of the estimated frequency offset amount $\Delta f_{est}$ calculated by the arithmetic unit 47.

Returning to FIG. 1, the phase compensation unit 27 detects a phase offset component which is a phase difference between the signal light and the local signal light based on the digital signal subjected to the frequency offset compensation by the frequency offset compensation unit 26. The phase compensation unit 27 performs phase compensation by removing the detected phase offset component from the digital signal subjected to the frequency offset compensation by the frequency offset compensation unit 26. Thus, the constellation of the transmission data is reproduced in the data sequence included in the payload of the digital signal.

The demodulation unit 28 demodulates the transmission data from the constellation of the transmission data reproduced in the data sequence included in the digital signal subjected to the phase compensation by the phase compensation unit 27.

(Processing of Frequency Offset Compensation Unit of First Embodiment)

Figure 4:
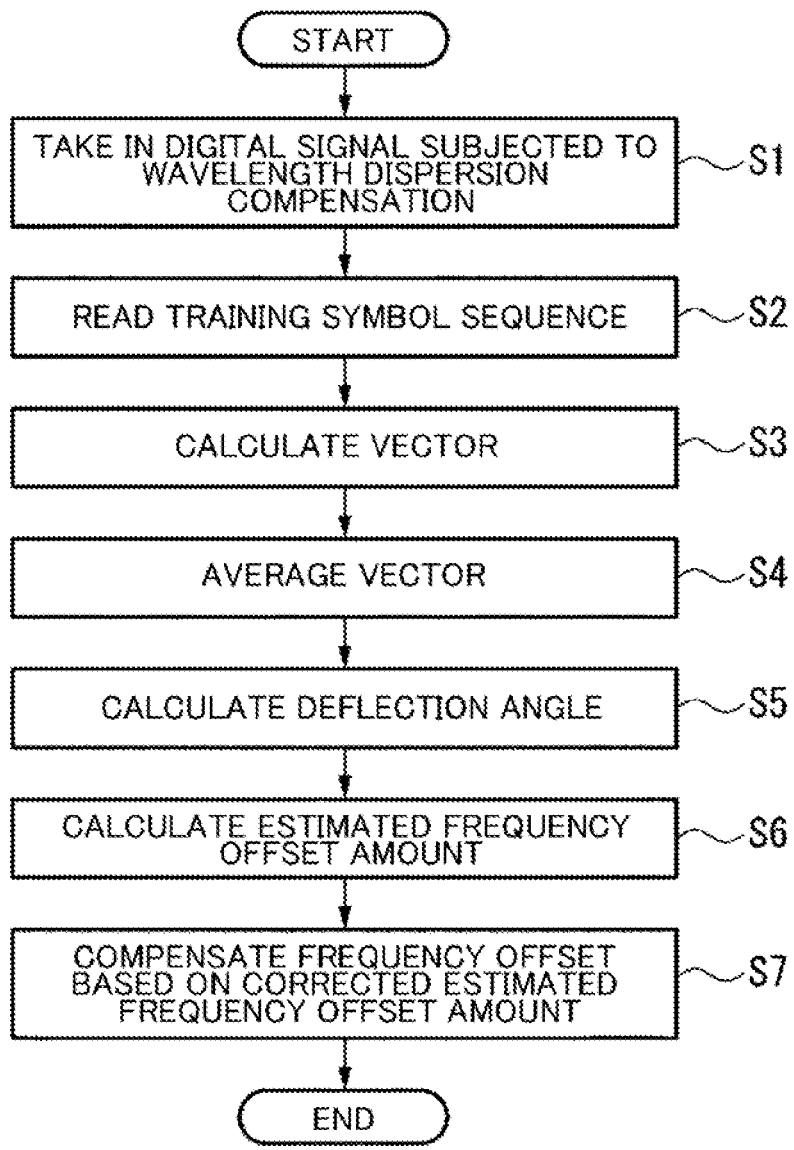
FIG. 4 is a flowchart showing a flow of processing executed by the frequency offset compensation unit of the first embodiment.

Next, the processing performed by the frequency offset compensation unit 26 of the optical reception device 1 of the first embodiment will be described. FIG. 4 is a flowchart showing a flow of the processing performed by the frequency offset compensation unit 26.

The wavelength dispersion compensation unit 25 outputs the digital signal subjected to the wavelength dispersion compensation to the frequency offset compensation unit 26. The digital signal subjected to the wavelength dispersion compensation by the wavelength dispersion compensation unit 25 is branched into two in the frequency offset compensation unit 26, one of which is sent to the frequency offset amount estimation unit 31, and the other is sent to the compensation processing unit 32. The timing detection unit 41 of the frequency offset amount estimation unit 31 takes in one of the two-branched digital signals (step S1).

The timing detection unit 41 detects the head position of the training symbol sequence from the preamble part of the digital signal taken in. The timing detection unit 41 reads the training symbol sequence from the digital signal on the basis of the head position of the detected training symbol sequence, and sequentially outputs a plurality of symbols included in the read training symbol sequence one symbol by one symbol for each symbol period T (step S2). Here, it is assumed that a symbol at time point t in the training symbol sequence is $a_r(t)$, and the time point t is a time for each symbol period T.

The symbol $a_r(t)$ sequentially outputted by the timing detection unit 41 is branched into two, one of which is sent to the multiplier 44 and the other is sent to the delay unit 42. The delay unit 42 takes in the other symbol branched into two. The delay unit 42 delays the symbol taken in by one symbol period T and outputs the delayed symbol. The complex conjugate unit 43 generates the complex conjugate of the symbol output by the delay unit 42 and outputs it to the multiplier 44. The multiplier 44 multiplies one of the two-branched symbols by a complex conjugate symbol of a symbol delayed by one symbol period T outputted by the complex conjugate unit 43, and calculates a vector $A_r(t)$ represented by the following formula (1) by performing differential detection (step S3).

[Math. 1]

$$A_r(t) = a_r(t)a_r(t-T)^* \cong \exp\left(j\frac{n\pi}{2} + 2\pi\Delta fT + \theta_n(t)\right) \quad (1)$$

As shown in the formula (1), the vector $A_r(t)$ can be approximated by a phase component, that is, a formula of exp. In the formula (1), the first term is a modulation component, the second term is a frequency offset component, and the third term is a phase noise component in parentheses of exp.

The vector averaging unit 45 takes in the vector $A_r(t)$ calculated and outputted by the multiplier 44, and calculates the sum of N vectors $A_r(t)$ which a predetermined number among the vectors $A_r(t)$ taken in to calculate a vector average (step S4. Hereinafter, the vector average of the vector $A_r(t)$ calculated by the vector averaging unit 45 is described as "$\Sigma_N A_r(t)$".

Here, each of a plurality of symbols included in the training symbol sequence is differentially encoded in advance in the optical transmission device 2 so that the phase of the QPSK four-value symbol becomes any one of three phases of $n\pi/2$ (where n=1, 2, and 3) after the differential detection. Therefore, when the vector averaging unit 45 calculates the vector average $\Sigma_N A_r(t)$, the modulation component of the first term of n=1 and 3 is canceled. In addition, each of the plurality of symbols included in the training symbol sequence is differentially encoded in advance in the optical transmission device 2 so that a phase becomes "$\pi$" when the vector average $\Sigma_N A_r(t)$ is calculated after the differential detection when a frequency offset is not generated.

Figure 5:
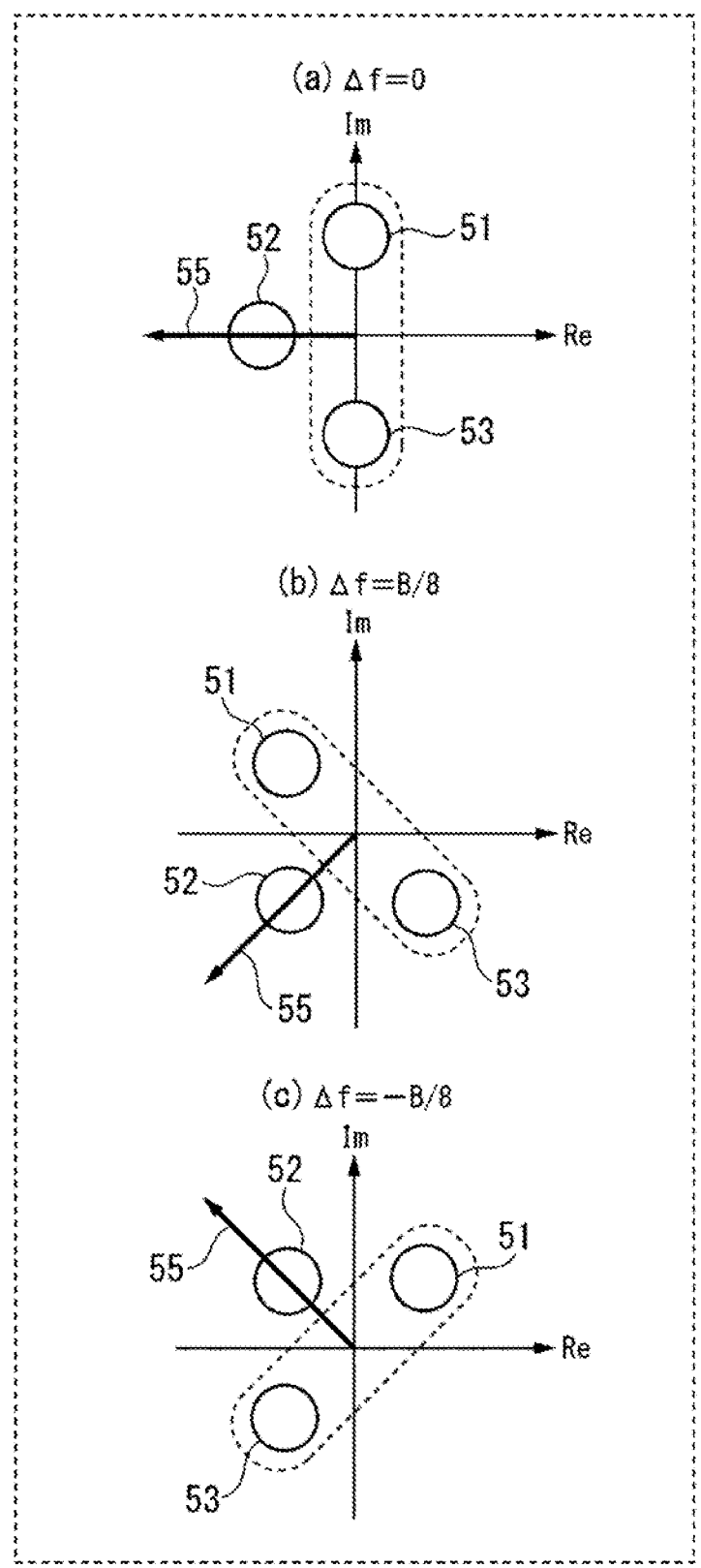
FIG. 5 is a diagram explaining a calculation process of a frequency offset amount of the first embodiment.

When a symbol included in the vector average $\Sigma_N A_r(t)$ calculated by the vector averaging unit 45 is indicated on a complex plane for each case where the frequency offset amount $\Delta f$ is $\Delta f=0$, B/8, $-$B/8, each corresponds to FIGS. 5 (a), (b), and (c). In FIGS. 5 (a), (b), and (c), the phase of the sign 51 is the phase of the symbol of n=1 of the vector average $\Sigma_N A_r(t)$, the phase of the sign 52 is the phase of the symbol of n=2, and the phase of the sign 53 is the phase of the symbol of n=3 (hereinafter referred to as "symbol 51", "symbol 52", and "symbol 53"). Therefore, the symbol 51 of n=1 and the symbol 53 of n=3 cancel each other, and the direction in which the symbol 52 of n=2 when viewed from the origin exists, that is, the direction indicated by the sign 55 shows the direction of the vector average $\Sigma_N A_r(t)$.

In FIG. 5 (a), since the frequency offset amount $\Delta f=0$, the direction of the vector average $\Sigma_N A_r(t)$ indicated by the sign 55 is a direction along a real number axis, that is, the direction of the phase "$\pi$". In FIGS. 5 (b) and (c), the frequency offset amounts are $\Delta f=$B/8, $-$B/8, respectively. Therefore, the direction of the vector average $\Sigma_N A_r(t)$ indicated by the sign 55 is a direction having an inclination corresponding to the frequency offset amount $\Delta f$. Therefore, the estimated frequency offset amount $\Delta f_{est}$ can be calculated by using the deflection angle of the vector average $\Sigma_N A_r(t)$.

The deflector 46 calculates the deflection angle of the vector average $\Sigma_N A_r(t)$ calculated and output by the vector averaging unit 45, that is, arg ($\Sigma_N A_r(t)$). The deflector 46 outputs the calculated deflection angle of the vector average $\Sigma_N A_r(t)$ to the arithmetic unit 47 (step S5). The arithmetic unit 47 takes in the deflection angle of the vector average $\Sigma_N A_r(t)$ outputted by the deflector 46. In the training symbol sequence, when the vector averaging unit 45 calculates the sum of the N vectors, the phase noise which is the third term of the phase component of the vector $A_r(t)$ becomes substantially "0". As described above, when the frequency offset amount $\Delta f=0$ is satisfied, the deflection angle of the vector average $\Sigma_N A_r(t)$ becomes "$\pi$". Therefore, the arithmetic unit 47 performs the arithmetic operation shown by the following formula (2), and sets the arithmetic result as the estimated frequency offset amount $\Delta f_{est}$. The operation shown in the following formula (2) is an operation in which "$\pi$" is subtracted from the deflection angle of the vector average $\Sigma_N A_r(t)$ and then divided by $2\pi T$.

[Math. 2]

$$\Delta f_{est} \cong \frac{\text{Arg}\left(\sum_N A_r(t)\right) - \pi}{2\pi T} \quad (2)$$

The arithmetic unit 47 outputs the estimated frequency offset amount $\Delta f_{est}$ to the compensation processing unit 32 (step S6). The compensation processing unit 32 takes in the other digital signal branched into two and the estimated frequency offset amount $\Delta f_{est}$ outputted by the arithmetic unit 47. The compensation processing unit 32 performs the frequency offset compensation on the digital signal taken in on the basis of the estimated frequency offset amount taken in $\Delta f_{est}$. The compensation processing unit 32 outputs the digital signal subjected to the frequency offset compensation to the phase compensation unit 27 (step S7).

(Description on the Case where the Frequency Offset Amount Exceeds the Estimated Range)

When the wavelength difference between the signal light received by the optical reception device 1 and the local light outputted by the local oscillation light source 11, that is, an actual frequency offset amount $\Delta f$ is not included in a range of $-B/2$ or more and $+B/2$ or less, since the frequency offset estimation unit 31 cannot estimate only in the range of $-B/2$ or more and $+B/2$ or less, an erroneous frequency offset amount is estimated.

Figure 6:
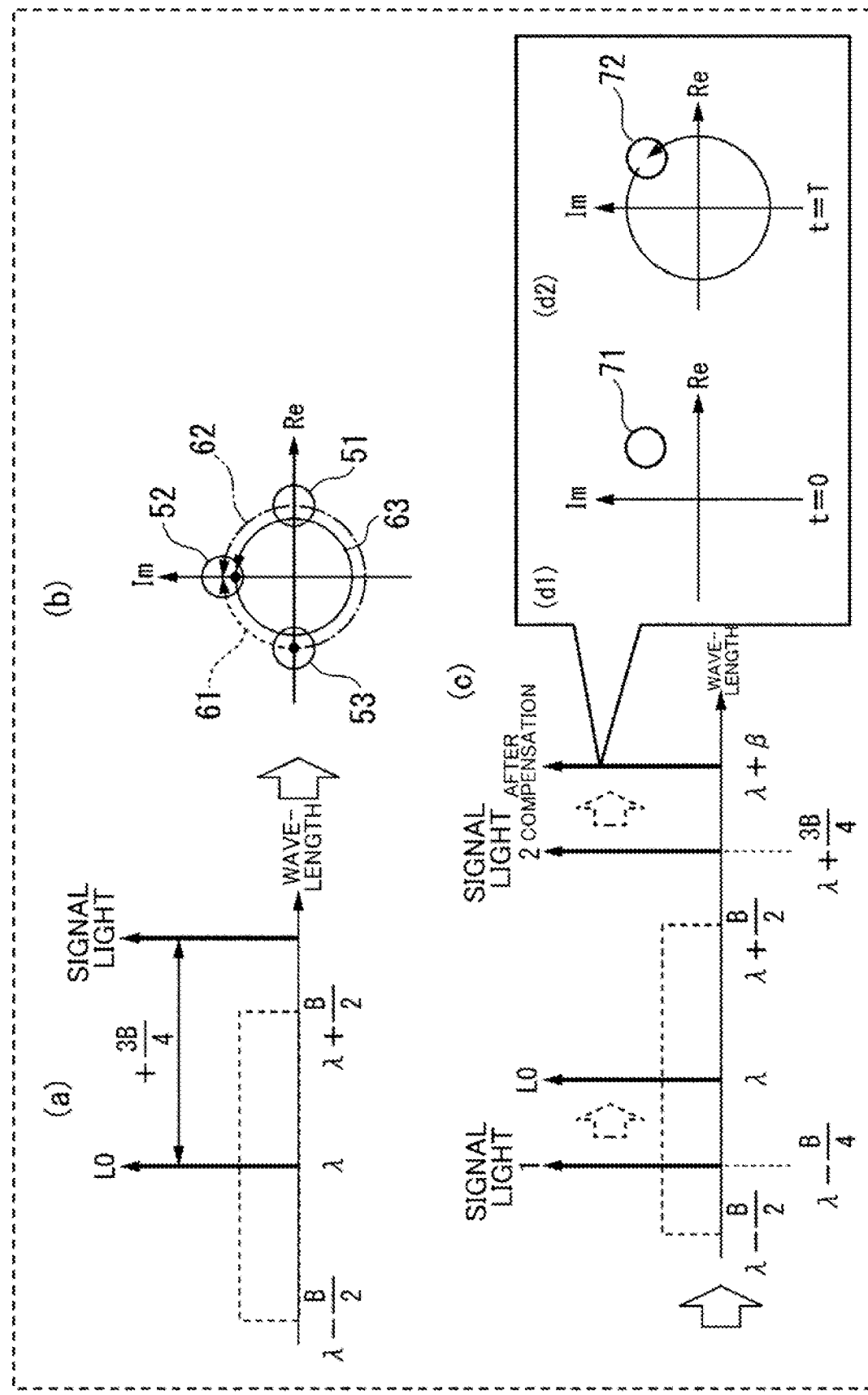
FIG. 6 is a diagram explaining a frequency offset compensation executed by the frequency offset compensation unit of the first embodiment.

For example, as shown in FIG. 6 (a), when the actual frequency offset amount $\Delta f$ is "+3B/4", the frequency offset amount estimation unit 31 calculates "$-B/4$" as the estimated frequency offset amount $\Delta f_{est}$. In this case, the compensation processing unit 32 performs the compensation by adding the phase rotation of "+B/4" in the reverse direction to compensate the frequency offset amount of "$-B/4$".

The process of this frequency offset compensation will be described with reference to the symbol 52 included in the vector average $\Sigma_N A_r(t)$ of the training symbol sequence shown in FIG. 6 (b) as an example. The symbol 52 has a frequency offset of "+3B/4" indicated by an arrow of a dashed line of sign 62. The compensation processing unit 32 performs the frequency offset compensation of "+B/4" in a reverse direction to an estimated frequency offset amount $\Delta f_{est}$ of "$-B/4$" indicated by an arrow of a broken line of a sign 61. Therefore, the frequency offset amount of the symbol 52 becomes "B" ($=3B/4+B/4$) as indicated by the solid line arrow of the sign 63. Hereinafter, the frequency offset amount indicated by sign 63 is referred to as a compensated frequency offset amount $\Delta f_c$.

When this state is observed on the wavelength axis as shown in FIG. 6 (c), for example, when the actual frequency offset amount $\Delta f$ is "$-B/4$" which is in the range of $-B/2$ or more and $+B/2$ or less ("signal light 1" shown in FIG. 6 (c)), a center wavelength of the signal light is changed from "$\lambda-B/4$" to "$\lambda$" which is the center wavelength of the local signal after the compensation by the compensation processing unit 32. This is a so-called frequency offset compensation. On the other hand, when the actual frequency offset amount $\Delta f$ of the signal light is "+3B/4" in the above example (in the case of "signal light 2" shown in FIG. 6 (c)), the center wavelength of the signal light changes from "$\lambda+3B/4$" to "$\lambda+B$" after the compensation by the compensation processing unit 32.

An arbitrary symbol 71 of the data sequence included in the digital signal after the frequency offset compensation has been performed on the digital signal in which the frequency offset of the frequency offset amount $\Delta f=+3B/4$ has occurred and an adjacent symbol 72 adjacent to the symbol 71 have the following relationship. When the phase of the symbol 71 is at the position shown in FIG. 6 (d1) at time t=0, the phase of the adjacent symbol 72 is rotated by $2\pi$ as shown in FIG. 6 (d2) and becomes the same phase as that of the symbol 71 when the time t=T after the lapse of one symbol period T. Therefore, the phase difference between adjacent symbols becomes "0", and demodulation can be performed without being affected by the frequency offset.

The relationship between the actual frequency offset amount $\Delta f$ and the compensated frequency offset amount $\Delta f_c$ is represented by the following formula (3).

[Math 3]

$$\begin{aligned}
\Delta f_c &= -(m+1)B \quad \left(-\frac{(2m+3)B}{2} \le \Delta f < -\frac{(2m+1)B}{2}\right) \\
\Delta f_c &= 0 \quad \left(-\frac{B}{2} \le \Delta f < +\frac{B}{2}\right) \\
\Delta f_c &= (m+1)B \quad \left(\frac{(2m+1)B}{2} \le \Delta f < \frac{(2m+3)B}{2}\right)
\end{aligned} \quad (3)$$

In the formula (3), m is an integer of m≥0, that is, 0, or natural number. As shown in the formula (3), the compensated frequency offset amount $\Delta f_c$ is always an integer multiple of the symbol rate B. After the lapse of one symbol period T, the phase of the symbol is rotated by $2m\pi$, and the phase difference between adjacent symbols becomes "0", so that demodulation can be performed without being affected by the frequency offset in any case. However, when the frequency offset amount $\Delta f$ exceeds the reception band of the reception unit 12, the band of the electric analog signals taken in by the ADCs 22-1 to 22-4 becomes out of the reception band. Therefore, since the ADCs 22-1 to 22-4 cannot convert the analog signal into the digital signal, the frequency offset amount $\Delta f$ receivable by the optical reception device 1 is limited within the range of the reception band of the reception unit 12.

Figure 7:
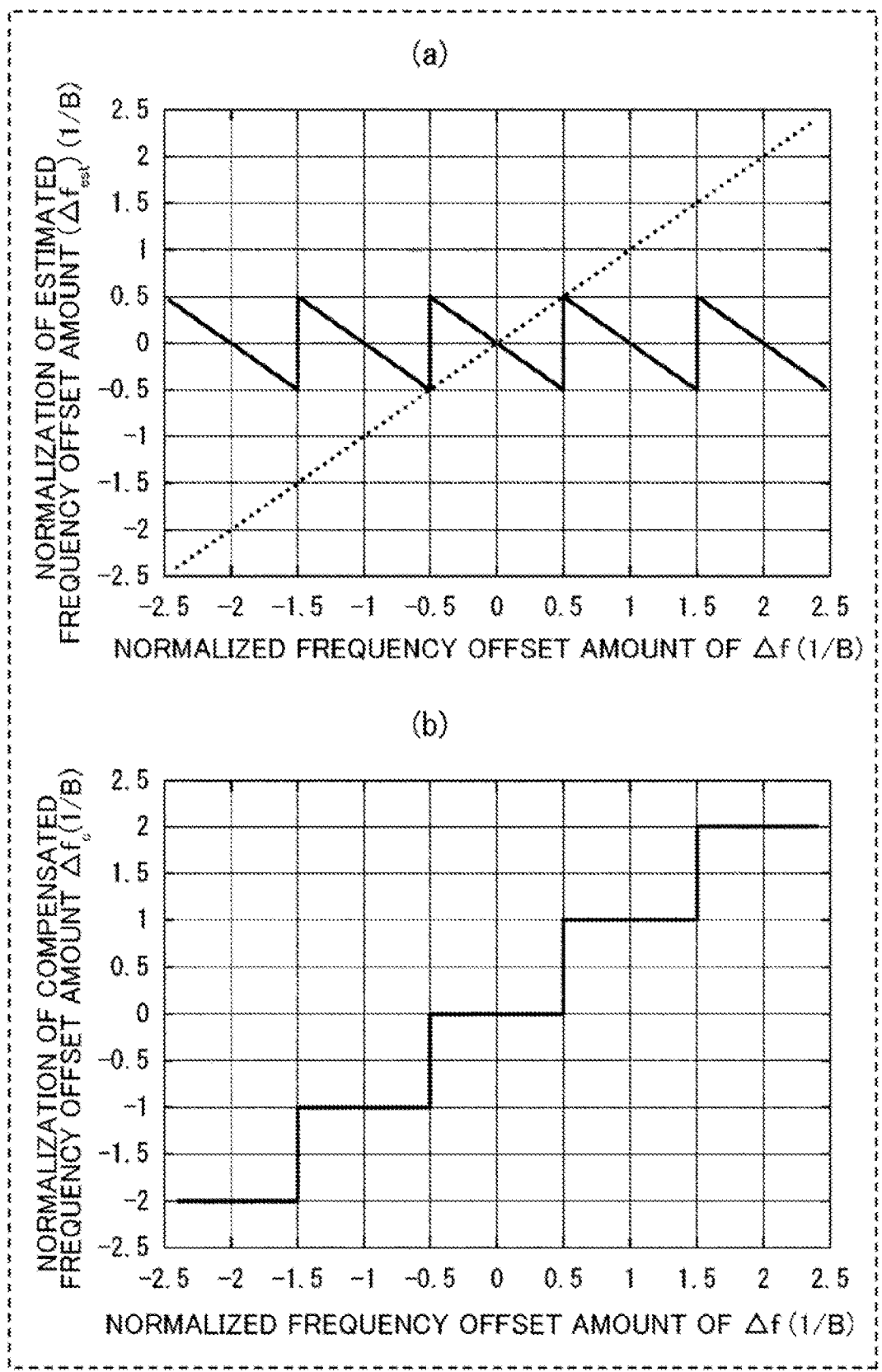
FIG. 7 is a graph showing a relationship between each of an estimated frequency offset amount and a compensated frequency offset amount and an actual frequency offset amount according to the first embodiment.

FIG. 7 is a graph showing the relationship between each of the estimated frequency offset amount $\Delta f_{est}$ and the compensated frequency offset amount $\Delta f_c$ and the actual frequency offset amount $\Delta f$. In FIG. 7 (a), the horizontal axis represents the actual frequency offset amount $\Delta f$ normalized at the symbol rate B. and the vertical axis represents the estimated frequency offset amount $\Delta f_{est}$ normalized at the symbol rate B. Note that the broken line in the graph indicates the case where the estimated frequency offset amount $\Delta f_{est}$ coincides with the actual frequency offset amount $\Delta f$. From the graph of the solid line in FIG. 7 (a), it can be seen that the estimated frequency offset amount $\Delta f_{est}$ is estimated in the range of $-0.5$ or more and $0.5$ or less, that is, in the range of $-B/$ or more and $+B/2$ or less.

In FIG. 7 (b), the horizontal axis represents the actual frequency offset amount $\Delta f$ normalized at the symbol rate B. and the vertical axis represents the compensated frequency offset amount $\Delta f_c$ normalized at the symbol rate B. From the graph of the solid line in FIG. 7 (b), it is seen that all of the compensated frequency offset amount $\Delta f_c$ is an integer multiple of the symbol rate B.

Figure 8:
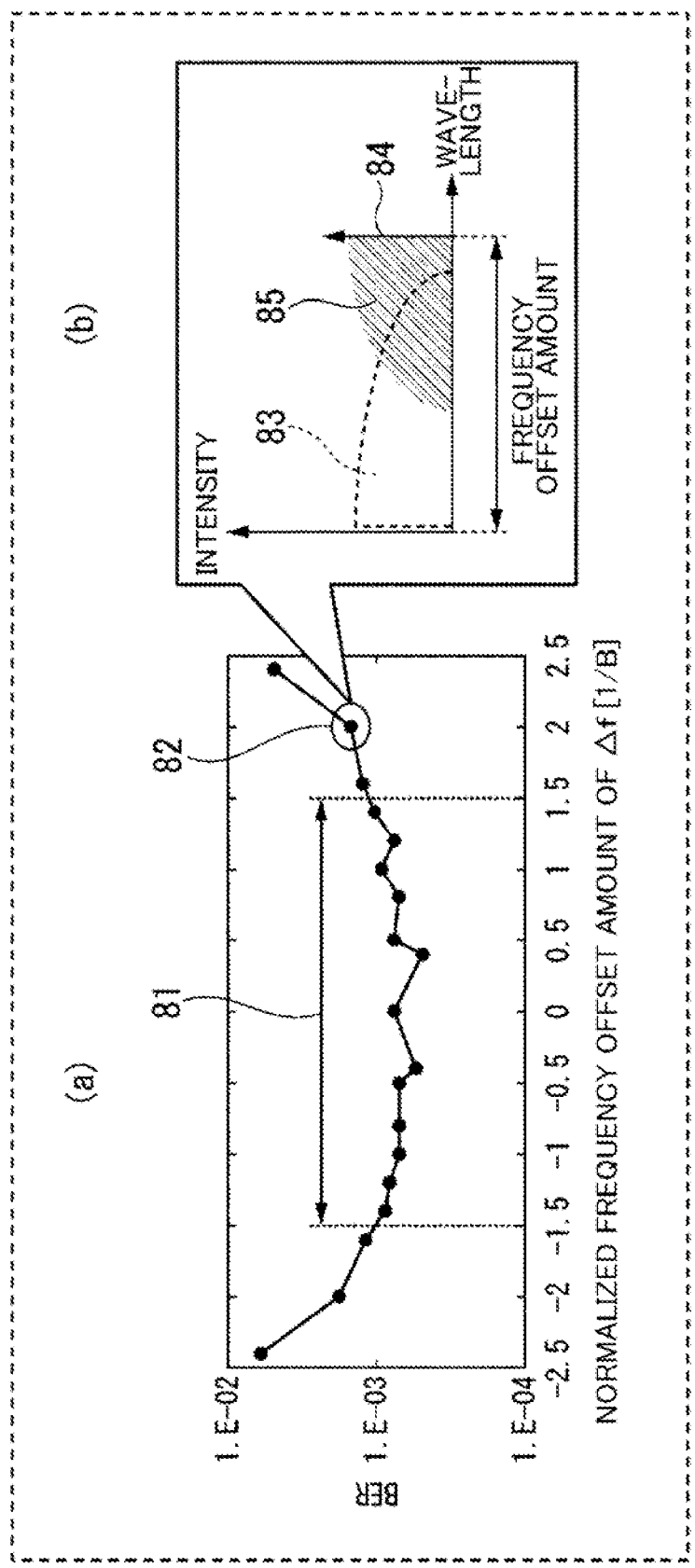
FIG. 8 is a diagram showing a simulation result by using the optical reception device of the first embodiment.

FIG. 8 (a) is a graph showing characteristics of a bit error rate (hereinafter referred to as "BER" (Bit Error Rate)) in the case where a simulation is performed for receiving a digital signal having several frequency offset amounts Δf in the optical reception device 1 of the first embodiment.

As an assumption of the simulation, the polarized wave phase diversity receiver 21 provided in the reception unit 12 performs the simulation with a configuration for performing phase diversity reception for simplification. It is assumed that an optical amplifier is disposed in front of the optical reception device 1, that is, the configuration in which the reception light received by the optical reception device 1 is amplified by the optical amplifier. The numerical conditions of the simulation are as follows. The wavelength of the signal light is "1.550 nm", the baud rate, that is, the symbol rate B is "12.5 Gbaud", the sampling rate of ADCs 22-1 to 22-4 is "50 GS/s", and the electric band Be of the reception unit 12 is "22 GHz". In this case. B/2 is 6.25 GHz, and Be >B/2 is satisfied. The gain of the optical amplifier is "20.0 dB", the noise figure is "6.0 dB", and the received power of the signal light received by the reception unit 12 of the optical reception device 1 is "−43.5 dBm".

In FIG. 8 (a), the horizontal axis represents the actual frequency offset amount Δf normalized by the symbol rate B, and the vertical axis represents the BER. The frequency offset amount Δf corresponding to the position of the circle mark existing on the polygonal line graph shown in FIG. 8 (a) is the frequency offset amount Δf of the signal light given as the calculation parameter. As can be seen from the graph of FIG. 8 (a), in the normalized frequency offset amount Δf indicated by a sign 81 in the range of −1.5 to 1.5, good BER characteristics are obtained, and even in the case of the frequency offset amount Δf exceeding the range of −0.5 or more and +0.5 or less, that is, a range of −2/B or more and +2/B or less, it can be seen that good BER characteristics are obtained.

When the frequency offset amount Δf becomes large, in a region where a good BER cannot be obtained, for example, when the frequency offset amount Δf indicated by a sign 82 is "2B", as shown in FIG. 8 (b), the wavelength of the signal light 84 exceeds the electric band Be of the reception unit 12 indicated by a sign 83. Therefore, since many parts of a modulation spectrum, which is the beat components of the signal light and the local light indicated by a sign 85, exist outside the reception band of the reception unit 12, the BER deteriorates, and the signal-to-noise ratio (hereinafter referred to as "SNR" (Signal-to-Noise Ratio)) also deteriorates.

Note that although the simulation is performed by the configuration for performing phase diversity reception as described above, the same result can be obtained by the configuration for performing polarized wave diversity reception.

In the optical reception device 1 of the first embodiment, the local oscillation light source 11 generates local oscillation light. The reception unit 12 receives, in a situation where the electric band is in a range from −Be to +Be and Be >B/2 is satisfied, signal light of the symbol rate B generated by optically modulating transmission data, and performs the digital coherent reception by interfering the received signal light with the local oscillation light generated by the local oscillation light source 11 and converts the signal light to the electric digital signal to output the digital signal. The digital signal processing unit 13 demodulates the transmission data from the digital signals outputted by the reception unit 12. The frequency offset compensation unit 26 provided in the digital signal processing unit 13 estimates the frequency offset amount generated in the digital signal in a range of −B/2 or more and +B/2 or less in accordance with the frequency difference between the signal light and the local oscillation light, and performs the frequency offset compensation on the digital signal on the basis of the estimated frequency offset amount to compensate the frequency offset amount in the range of −B/2 or more and +B/2 or less and to compensate so as to remain the frequency offset amount of an integer multiple of the symbol rate B when the frequency offset amount is in a range of less than B/2 and a range of more than +B/2.

When a signal having a low symbol rate B is received as in an access network, an estimation capable range of the frequency offset amount estimation unit 31 becomes narrow. However, even if a frequency offset amount in a range of less than B/2 and a range of more than +B/2 occurs in signal light, the frequency offset amount can be set to an integer multiple of the symbol rate B, that is, ±(m+1) B (where m is an integer of m≥0) by using the optical reception device 1 of the first embodiment. In this case, when one symbol period T passes, the phase rotation of 2mπ is added to the next symbol, and since the phase difference from the adjacent symbol becomes "0", the demodulation becomes possible. Therefore, by using the optical reception device 1 of the first embodiment, while using a conventional frequency offset system in which an estimation range of the frequency offset amount is in a range of −B/2 or more and +B/2 or less when a symbol rate is B, that is, even if a frequency offset amount in a range exceeding the estimation range of the frequency offset amount, that is, in a range of less than B/2 and a range of more than +B/2 is generated, the demodulation can be performed. In addition to this, the optical reception device 1 uses the conventional frequency offset system, so that the cost required for manufacturing can be reduced. Even when the symbol rate B is lowered, the signal light in which frequency offset in a range if less than −B/2 and a range of more than +B/2 is generated can be demodulated, so that the requirement of frequency stability required for a light source used in generating the signal light provided in the optical transmission device can be relaxed, and the cost required for manufacturing the optical transmission device 2 can be reduced.

When the optical transmission system A of the above embodiment is applied to an assumed actual network configuration, the optical transmission device 2 corresponds to a transmitter provided in an ONU (Optical Network Unit) of an access network, the optical reception device 1 corresponds to a coherent receiver provided in an OLT (Optical Line Terminal) of the access network. It is assumed that the transmitter provided in the ONU of the access network uses inexpensive equipment than a transmitter used in a core network from the viewpoint of cost. On the other hand, since the coherent receiver provided in the OLT can be shared by a plurality of users, the cost can be increased, so that high-performance equipment can be applied. In this case, it is assumed that a symbol rate B generally utilized in the access network is, for example, from 10 GBaud to 25 GBaud. On the other hand, in the core network, for example, a signal of 25 GBaud to 60 GBaud is used. Therefore, when the signal of the symbol rate B from 10 GBaud to 25 GBaud is received by using the receiver capable of receiving the signal of 25 GBaud to 60 GBaud used in the core network, an electric band Be of the receiver is 25 GBaud to 60 GBaud, so that Be >B/2 is sufficiently satisfied. For example, when the symbol rate B is 10 GBaud of the minimum value, the estimated frequency offset amount is in a range of −5 GBaud or more and +5 GBaud or less. When an inexpensive transmitter is used, it is assumed that the frequency of the signal light is unstable, and a large amount of frequency offset is generated outside the range of −5 GBaud or more and +5 GBaud or less. In such a case, by using the optical reception device 1 of the present embodiment, transmission data can be demodulated even when the estimation range of the frequency offset amount is narrow as described above. In the above, 10 GBaud is used, for example, for XGS-PON (Passive Optical Network), NG (Next Generation)-PON2, 10 G-EPON (Ethernet (registered Trademark)-PON), or the like, 25 GBaud is used, for example, for 50 G-PON or the like. In addition, for example, 25 GBaud is used for DP (Dual-Polarization)-QPSK100 Gbps or the like, and 60 GBaud is used for DP-16QAM (Quadrature Amplitude Modulation) 400 Gbps or the like.

Second Embodiment

Figure 9:
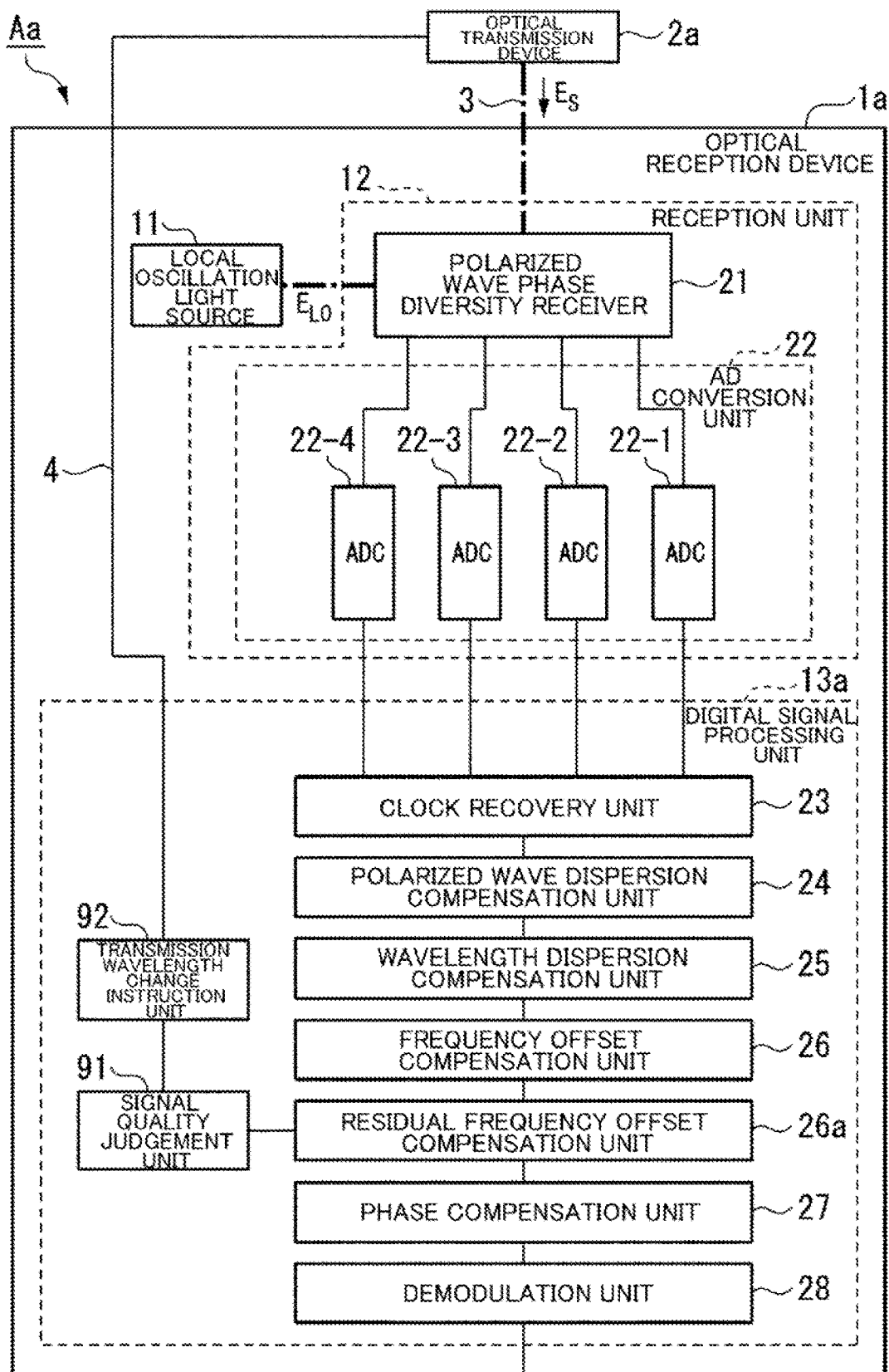
FIG. 9 is a block diagram showing a configuration of an optical transmission system of a second embodiment.

FIG. 9 is a block diagram showing a configuration of an optical transmission system Aa according to a second embodiment. Also in FIG. 9, a connection line indicated by a dashed line is an optical line through which an optical signal propagates, and other connection lines are an electric line through which an electric signal propagates. In the optical transmission system Aa, the same configurations as those of the optical transmission system A of the first embodiment are designated by the same signs, and different configurations will be described below.

As described with reference to FIG. 8 (b), in the optical reception device 1 of the first embodiment, when the absolute value of the actual frequency offset amount Δf becomes close to the electric band Be of the reception unit 12, quality degradation occurs in the received signal. Therefore, an estimation error occurs also in the estimated frequency offset amount $\Delta f_{est}$ calculated by the frequency offset amount estimation unit 31 provided in the frequency offset compensation unit 26. In the second embodiment, the estimation error amount is detected, the detected estimation error amount is used as an index indicating the deterioration degree of signal quality, and it is judged whether the absolute value of the actual frequency offset amount Δf is close to the electric band Be of the reception unit 12 by using this index. The second embodiment includes a configuration in which the wavelength of the signal light is changed when it is judged that the absolute value of the actual frequency offset amount Δf is close to the electric band Be of the reception unit 12.

The optical transmission system Aa includes an optical reception device 1a, an optical transmission device 2a, an optical transmission line 3 that connects the optical reception device 1a and the optical transmission device 2a, and a communication line 4. Note that although the communication line 4 is shown as an electric line, it may be an optical line like the optical transmission line 3. The optical transmission device 2a has the same configuration as that of the optical transmission device 2 of the first embodiment, and further has a configuration for changing the wavelength of a light source used for generating signal light provided inside when receiving an instruction signal instructing to change the wavelength of signal light through the communication line 4.

The optical reception device 1a includes a local oscillation light source 11, a reception unit 12 and a digital signal processing unit 13a. The digital signal processing unit 13a includes a clock recovery unit 23, a polarized wave dispersion compensation unit 24, a wavelength dispersion compensation unit 25, a frequency offset compensation unit 26, a residual frequency offset compensation unit (residual frequency offset compensator) 26a, a phase compensation unit 27, a demodulation unit 28, a signal quality judgement unit (signal quality judger) 91, and a transmission wavelength change instruction unit (transmission wavelength change instructor) 92.

Figure 10:
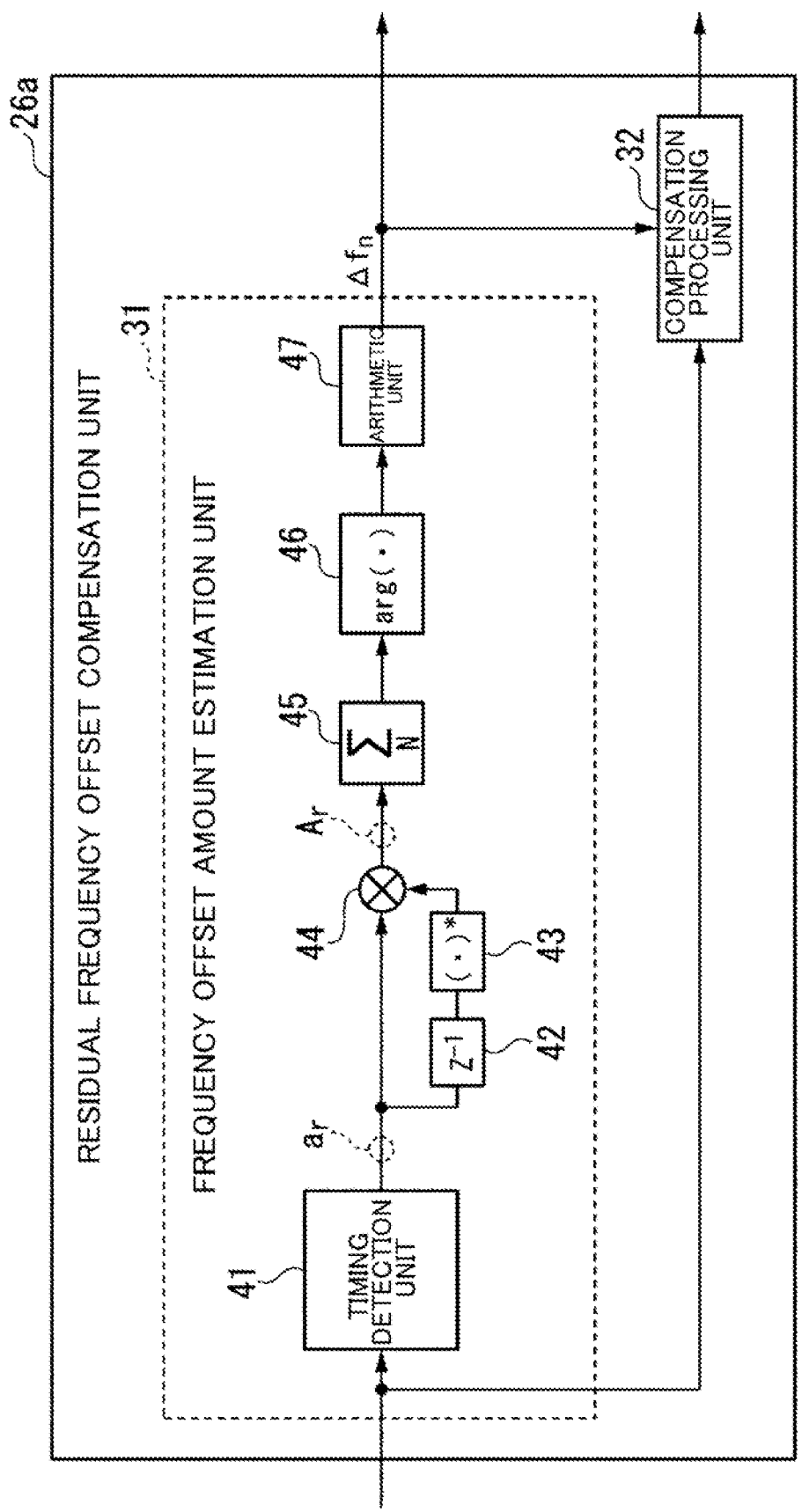
FIG. 10 is a block diagram showing an internal configuration of a residual frequency offset compensation unit of the second embodiment.

As shown in FIG. 10, the residual frequency offset compensation unit 26a has the same configuration as that of the frequency offset compensation unit 26 except that an output destination of the arithmetic unit 47 is connected to the compensation processing unit 32 and the signal quality judgement unit 91.

A frequency offset amount estimation unit 31 provided in the residual frequency offset compensation unit 26a estimates a residual frequency offset amount $\Delta f_n$ on the basis of the digital signal subjected to the frequency offset compensation by the frequency offset compensation unit 26 on the basis of the estimated frequency offset amount $\Delta f_{est}$. Here, the residual frequency offset amount $\Delta f_n$ is the estimation error amount included in the estimated frequency offset amount $\Delta f_{est}$ calculated by the frequency offset amount estimation unit 31 of the frequency offset compensation unit 26, as described above.

The estimated frequency offset amount $\Delta f_{est}$ is expressed as the sum of the actual frequency offset amount Δf and the residual frequency offset amount $\Delta f_n$ which is the estimation error amount. In consideration of the residual frequency offset amount $\Delta f_n$, the formula (3) is expressed as the following formula (4).

[Math. 4]

$$\begin{aligned} \Delta f_c &= -(m+1)B + \Delta f_n & \left(-\frac{(2m+3)B}{2} \le \Delta f < -\frac{(2m+1)B}{2}\right) \\ \Delta f_c &= 0 + \Delta f_n & \left(-\frac{B}{2} \le \Delta f < +\frac{B}{2}\right) \\ \Delta f_c &= (m+1)B + \Delta f_n & \left(\frac{(2m+1)B}{2} \le \Delta f < \frac{(2m+3)B}{2}\right) \end{aligned} \quad (4)$$

As shown in the formula (4), the residual frequency offset amount $\Delta f_n$ is also included in the compensated frequency offset amount $\Delta f_c$.

Figure 11:
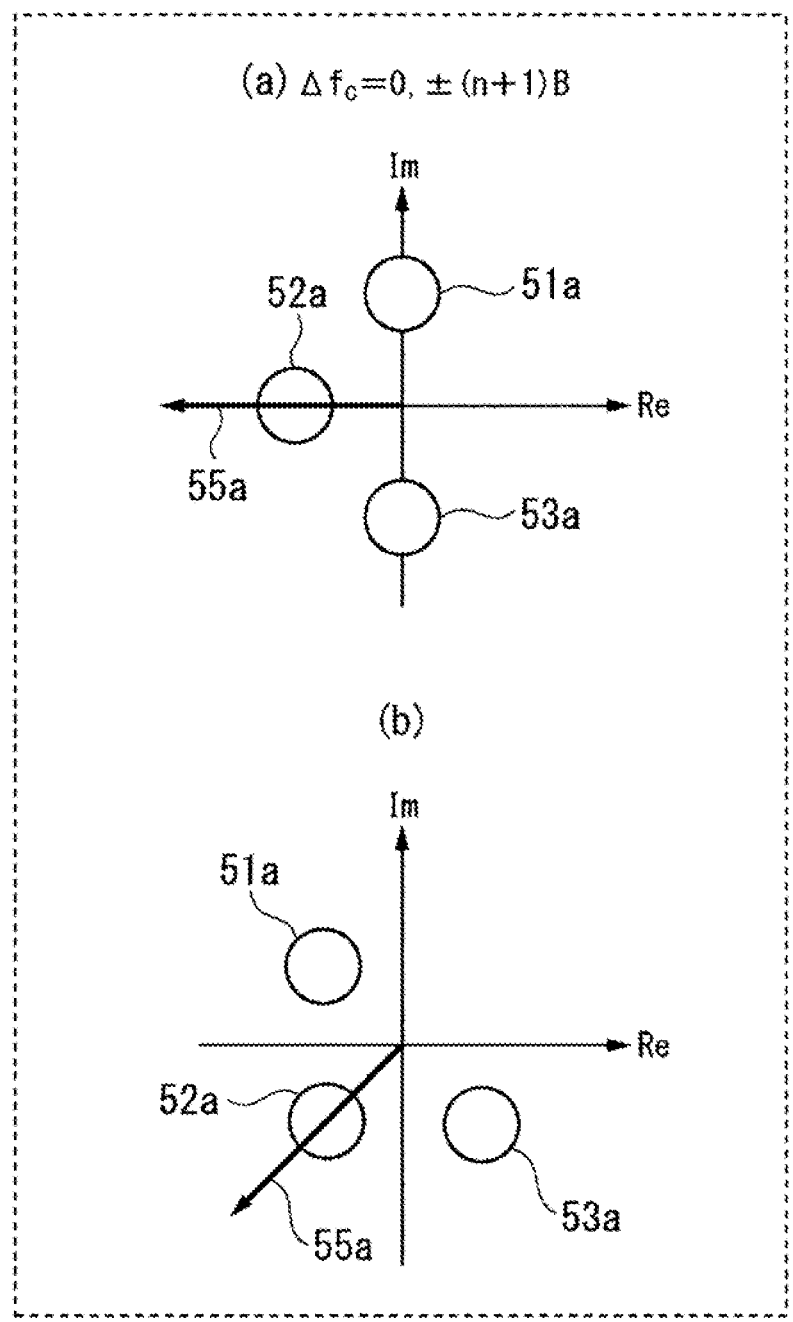
FIG. 11 is a diagram explaining a calculation process of a residual frequency offset compensation amount according to the second embodiment.

FIG. 11 shows three symbols included in the vector average $\Sigma_N A_r(t)$ outputted by the vector averaging unit 45 of the residual frequency offset compensation unit 26a on a complex plane when the digital signal subjected to the frequency offset compensation based on the estimated frequency offset amount $\Delta f_{est}$ is given to the frequency offset amount estimation unit 31 of the residual frequency offset compensation unit 26a. In FIGS. 11 (a) and (b), the phase of a sign 51a is the phase of a symbol of n=1, the phase of a sign 52a is the phase of a symbol of n=2, and the phase of a sign 53a is the phase of a symbol of n=3 (hereinafter referred to as "symbol 51a", "symbol 52a", and "symbol 53a").

FIG. 11 (a) is a diagram showing the vector average $\Sigma_N A_r(t)$ when the compensated frequency offset amount $\Delta f_c$ is $\Delta f_c=0$ or ±(m+1)B, that is, when the residual frequency offset amount $\Delta f_n$ is not superimposed. As described in the first embodiment, the symbol 51a of n=1 and the symbol 53a of n=3 cancel each other, and the direction in which the symbol 52a of n=2 viewed from the origin exists, that is, the direction indicated by a sign 55a shows the direction of the vector average $\Sigma_N A_r(t)$. In the case of FIG. 11 (*a*), since the direction indicated by the sign 55a is the direction along the real number axis, the residual frequency offset amount $\Delta f_n$ becomes $\Delta f_n=0$.

FIG. 11 (*b*) is a diagram showing the vector average $\Sigma_N A_r(t)$ when the compensated frequency offset amount $\Delta f_c$ is $\Delta f_c \neq 0$ or $\pm(m+1)B$, that is, the residual frequency offset amount $\Delta f_n$ having a value other than 0 is superimposed. As in the case of FIG. 11 (*a*), n=1 and 3 are canceled each other, and the direction in which the symbol 52a of n=2 exists vied from the origin, that is, the direction indicated by the sign 55a shows the direction of the vector average $\Sigma_N A_r(t)$. In the case of FIG. 11 (b), the direction indicated by the sign 55a is a direction having an inclination corresponding to the residual frequency offset amount $\Delta f_n$. Therefore, the residual frequency offset amount $\Delta f_n$ can be calculated in a range of $-B/2$ or more and $+B/2$ or less by using the deflection angle of the vector averaging unit 45 of the residual frequency offset compensation unit 26a.

Returning to FIG. 9, the signal quality judgement unit 91 is connected to the arithmetic unit 47 of the frequency offset amount estimation unit 31 of the residual frequency offset compensation unit 26a, and takes in the residual frequency offset amount $\Delta f_n$ calculated by the arithmetic unit 47. The signal quality judgement unit 91 uses the residual frequency offset amount $\Delta f_n$ taken in as the index indicating the deterioration degree of the signal quality of the digital signal, and judges, on the basis of the residual frequency offset amount $\Delta f_n$ and a predetermined threshold value, whether or not the signal quality of the digital signal is deteriorated.

The transmission wavelength change instruction unit 92 is connected to the communication line 4, and transmits an instruction signal instructing the optical transmission device 2a to change the wavelength of the signal light through the communication line 4 when the signal quality judgement unit 91 judges that the signal quality of the digital signal is deteriorated.

(Processing of Residual Frequency Offset Compensation Unit of Second Embodiment)

Figure 12:
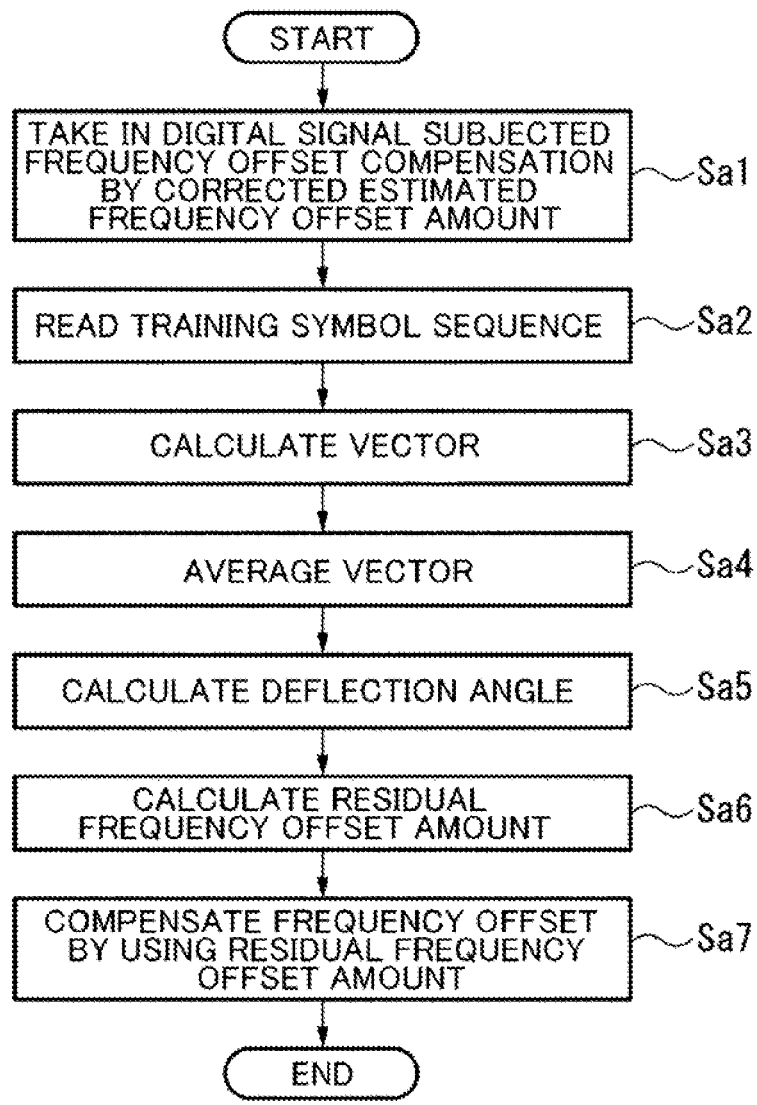
FIG. 12 is a flowchart showing a flow of processing executed by the residual frequency offset compensation unit of the second embodiment.

FIG. 12 is a flow chart showing a flow of processing by the residual frequency offset compensation unit 26a. The residual frequency offset compensation unit 26a takes in the digital signal subjected to the frequency offset compensation by the frequency offset compensation unit 26 (step Sa1). In steps Sa2 to Sa6, processing similar to that in steps S2 to S6 shown in FIG. 4 is performed by the frequency offset amount estimation unit 31 of the residual frequency offset compensation unit 26a. However, in the step Sa6, the arithmetic unit 47 calculates and outputs not the estimated frequency offset amount $\Delta f_{est}$ but the residual frequency offset amount $\Delta f_n$.

The compensation processing unit 32 of the residual frequency offset compensation unit 26a takes in the other digital signal branched into two and the residual frequency offset amount $\Delta f_n$ calculated and outputted by the arithmetic unit 47 of the residual frequency offset compensation unit 26a. The compensation processing unit 32 of the residual frequency offset compensation unit 26a performs the frequency offset compensation to the digital signal taken in on the basis of the residual frequency offset amount $\Delta f_n$ taken in. The compensation processing unit 32 of the residual frequency offset compensation unit 26a outputs the digital signal subjected to the frequency offset compensation to the phase compensation unit 27 (step Sa7).

(Processing by Signal Quality Judgement Unit and Transmission Wavelength Change Instruction Unit of Second Embodiment)

Figure 13:
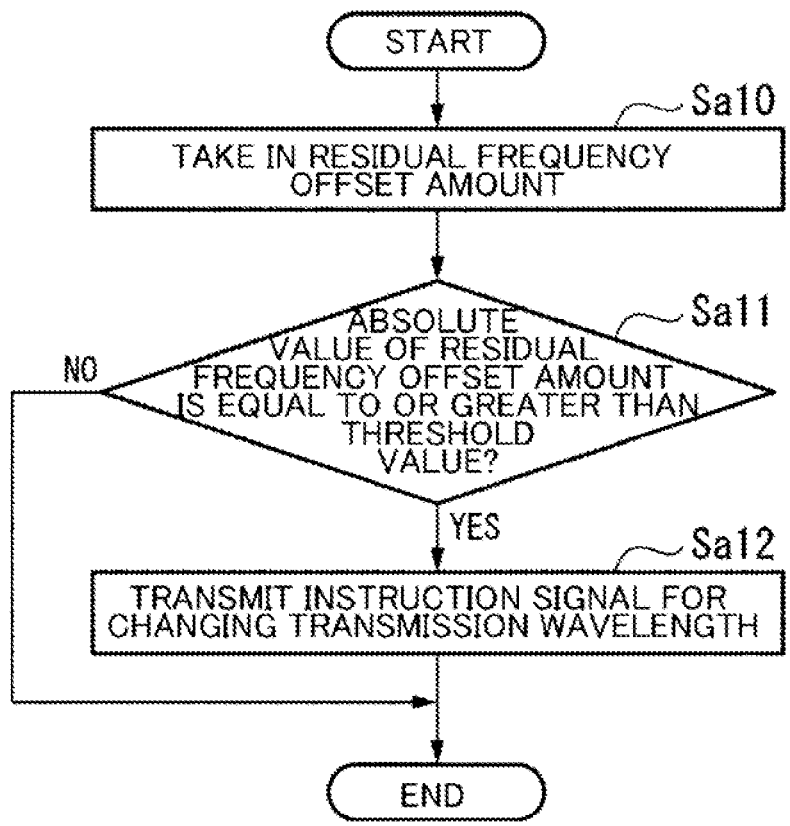
FIG. 13 is a flowchart showing a flow of processing executed by a signal quality judgement unit and a transmission wavelength change instruction unit of the second embodiment.

FIG. 13 is a flowchart showing a flow of processing performed by the signal quality judgement unit 91 and the transmission wavelength change instruction unit 92. The signal quality judgement unit 91 takes in the residual frequency offset amount $\Delta f_n$ calculated and outputted in processing of the step Sa6 of the flowchart shown in FIG. 12 by the arithmetic unit 47 of the frequency offset amount estimation unit 31 of the residual frequency offset compensation unit 26a (step Sa10). Note that the processing of the step Sa10 is processing performed in parallel with the processing of the step Sa7 shown in FIG. 12.

The signal quality judgement unit 91 uses the residual frequency offset amount $\Delta f_n$ taken in as the index indicating the deterioration degree of signal quality of the digital signal, and judges whether the absolute value of the residual frequency offset amount $\Delta f_n$ is equal to or more than a predetermined threshold value (step Sa11).

When it is judged that the absolute value of the residual frequency offset amount $\Delta f_n$ is not equal to or larger than the predetermined threshold value (step Sa11, No), the signal quality judgement unit 91 judges that the signal quality of the digital signal is not deteriorated, and terminates the processing. On the other hand, when it is judged that the absolute value of the residual frequency offset amount $\Delta f_n$ is equal to or more than the predetermined threshold value (step Sa11, Yes), the signal quality judgement unit 91 judges that the signal quality of the digital signal is deteriorated, and outputs the transmission instruction signal to the transmission wavelength change instruction unit 92.

When receiving the transmission instruction signal from the signal quality judgement unit 91, the transmission wavelength change instruction unit 92 transmits the wavelength change instruction signal instructing the optical transmission device 2a to change the wavelength of the signal light through the communication line 4 (step Sa13), and terminates the processing. When receiving the wavelength change instruction signal from the transmission wavelength change instruction unit 92 through the communication line 4, the optical transmission device 2a changes the wavelength of the signal light.

Here, the wavelength change amount may be a fixed amount predetermined in the optical transmission device 2a so as to finely adjust the wavelength of the signal light, or may be a variable amount determined by the optical transmission device 2a in accordance with the length of the wavelength of the signal light at that time. The optical transmission device 2a may be notified of a change amount of the wavelength having the length corresponding to the length of the absolute value of the residual frequency offset amount $\Delta f_n$ from the optical reception device 1a side as follows. For example, the signal quality judgement unit 91 stores a table in which a change amount of the wavelength corresponding to a range is determined for each range of magnitude of the absolute value of the residual frequency offset amount $\Delta f_n$ in an internal storage area, and detects the change amount of the wavelength corresponding to the magnitude of the absolute value of the residual frequency offset amount $\Delta f_n$ by referring to the table when outputting the transmission instruction signal to the transmission wavelength change instruction unit 92. The signal quality judgement unit 91 outputs the detected change amount of the wavelength to the transmission wavelength change instruction unit 92 while including the change amount of the wavelength in the transmission instruction signal. The transmission wavelength change instruction unit 92 transmits the change amount of the wavelength included in the transmission instruction signal to the optical transmission device 2a while including the change amount of the wavelength in the wavelength change instruction signal. When receiving the wavelength change instruction signal, the optical transmission device 2a reads the change amount of the wavelength included in the received wavelength change instruction signal, and changes the wavelength of the light source in accordance with the read change amount of the wavelength. Thus, the optical transmission device 2a can change the wavelength of the signal light in accordance with the magnitude of the absolute value of the residual frequency offset amount $\Delta f_n$.

Figure 14:
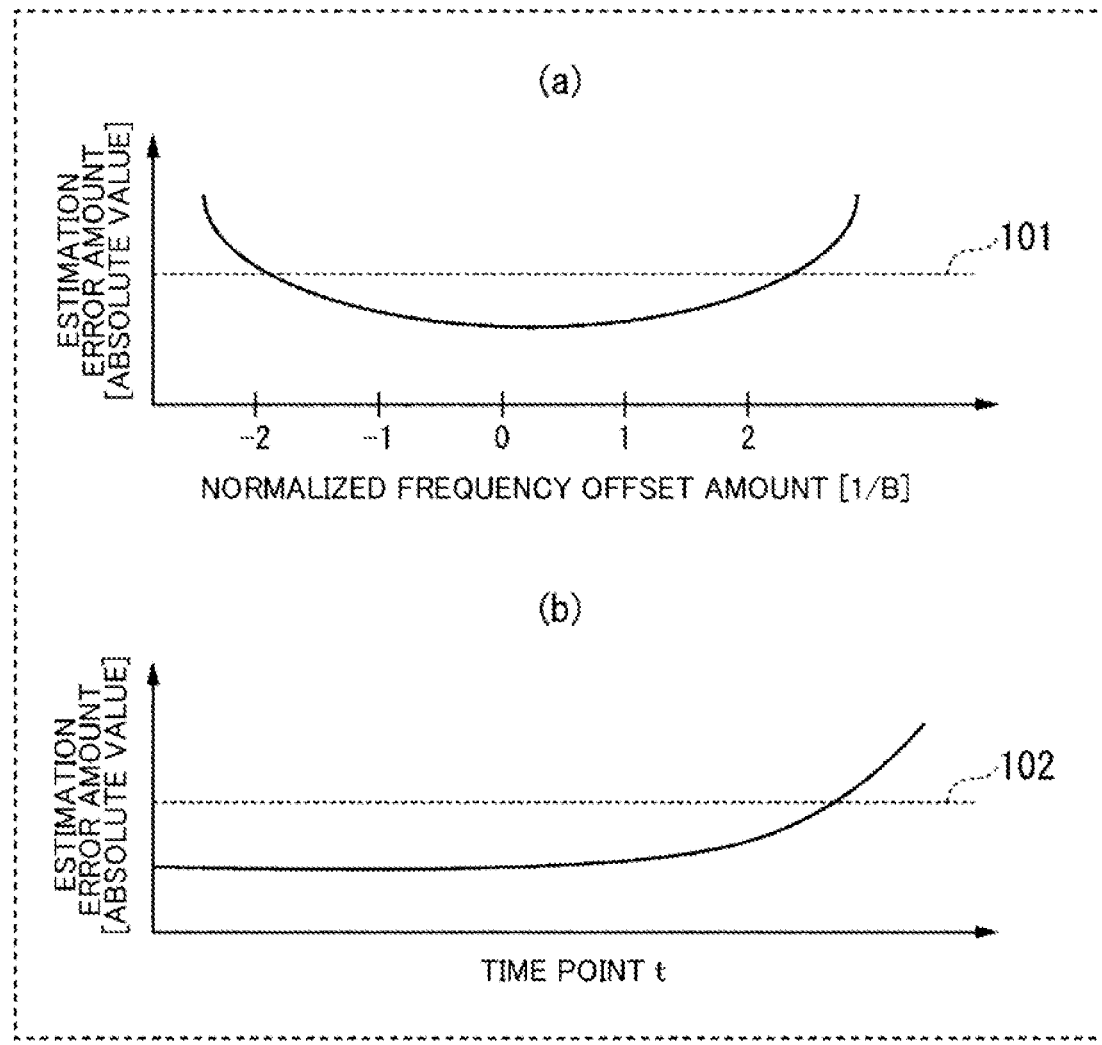
FIG. 14 is a diagram explaining how to determine a threshold to be referred to in the signal quality judgement unit of the second embodiment.

The threshold value to be referred to by the signal quality judgement unit 91 in the processing of the step Sa11 is selected in advance by the following method, for example. The relationship between the actual frequency offset amount $\Delta f$ normalized at the symbol rate B and the estimation error amount, that is, the absolute value of the residual frequency offset amount $\Delta f_n$ is measured in advance to create a graph as shown in FIG. 14 (a). In the created graph, the absolute value of the residual frequency offset amount $\Delta f_n$ corresponding to the frequency offset amount $\Delta f$ in which deterioration of signal quality occurs, that is, a value indicated by a sign 101, is selected as a threshold value.

For example, the average value is calculated from the time series data of the absolute value of the estimated error amount, that is, the residual frequency offset amount $\Delta f_n$, which is continuously measured in a steady state, that is, in a state in which the signal quality does not deteriorate, and the calculated average value may be selected as the threshold value. In the case where the threshold value is used, as shown in FIG. 14 (b), when the residual frequency offset amount $\Delta f_n$ becomes equal to or larger than an average value of absolute values of the residual frequency offset amount $\Delta f_n$ in a steady state, the signal quality judgement unit 91 judges that the signal quality is deteriorated.

As described above, when the absolute value of the actual frequency offset amount $\Delta f$ becomes close to the electric band Be of the reception unit 12, the received signal is deteriorated in quality due to the band limitation. In order to judge whether or not the deterioration of the signal quality occurs, in the second embodiment, the residual frequency offset compensation unit 26a calculates the estimated error amount caused by the deterioration of the signal quality, that is, the residual frequency offset amount $\Delta f_n$, and the calculated residual frequency offset amount $\Delta f_n$ is used as the index indicating deterioration of signal quality. The signal quality judgement unit 91 judges whether or not the signal quality is deteriorated on the basis of the residual frequency offset amount $\Delta f_n$ calculated by the residual frequency offset compensation unit 26a and the predetermined threshold value. Further, in the second embodiment, when the signal quality judgement unit 91 judges that the signal quality is deteriorated, the transmission wavelength change instruction unit 92 transmits the wavelength change instruction signal for instructing the optical transmission device 2a to change the wavelength of the signal light. Thus, in the optical transmission system Aa of the second embodiment, the wavelength of the signal light of the optical transmission device 2a is adjusted according to the quality deterioration of the reception signal, and the reception characteristics can be improved. Therefore, by using the configuration of the second embodiment, in addition to the effect of the optical transmission system A of the first embodiment, the requirement of the frequency stability of the light source used in generating the signal light provided in the optical transmission device 2a can be further relaxed, and the cost of the optical transmission device 2a can be reduced. In the second embodiment described above, since the frequency offset compensation is performed based on the residual frequency offset amount $\Delta f_n$, transmission data can be demodulated with higher accuracy than that in the first embodiment.

Note that, in the case of the second embodiment, the estimation error is further superimposed in the residual frequency offset compensation unit 26a. Therefore, in order to reduce the estimation error, the value of N being the averaging number of symbols is made larger than the case of the vector averaging unit 45 of the frequency offset compensation unit 26 in the calculation of the vector averaging unit 45 of the residual frequency offset compensation unit 26a, and the estimation error superimposed is reduced by the residual frequency offset compensation unit 26a, so that the estimation accuracy may be improved.

In the second embodiment, the timing detection unit 41 of the frequency offset amount estimation unit 31 provided in the residual frequency offset compensation unit 26a does not detect the head position of the training symbol sequence from the digital signal, but may utilize the head position of the training symbol sequence in the digital signal detected by the timing detection unit 41 of the frequency offset amount estimation unit 31 provided in the frequency offset compensation unit 26. In this case, a notification electric line is required for notifying the timing detection unit 41 of the frequency offset amount estimation unit 31 provided in the residual frequency offset compensation unit 26a of the head position of the training symbol sequence detected by the timing detection unit 41 of the frequency offset amount estimation unit 31 provided in the frequency offset compensation unit 26a.

In the second embodiment, the signal quality judgement unit 91 calculates an SNR on the basis of the residual frequency offset amount $\Delta f_n$, and may judge, on the basis of the calculated SNR and a threshold value predetermined for the SNR, whether or not the signal quality of the digital signal is deteriorated. The signal quality judgement unit 91 may output the judgement result to an external device such as a display device connected to the optical reception device 1a.

In the second embodiment, the phase compensation unit 27 may be provided with inside the residual frequency offset compensation unit 26a.

(Another Configuration Example of Second Embodiment)

Figure 15:
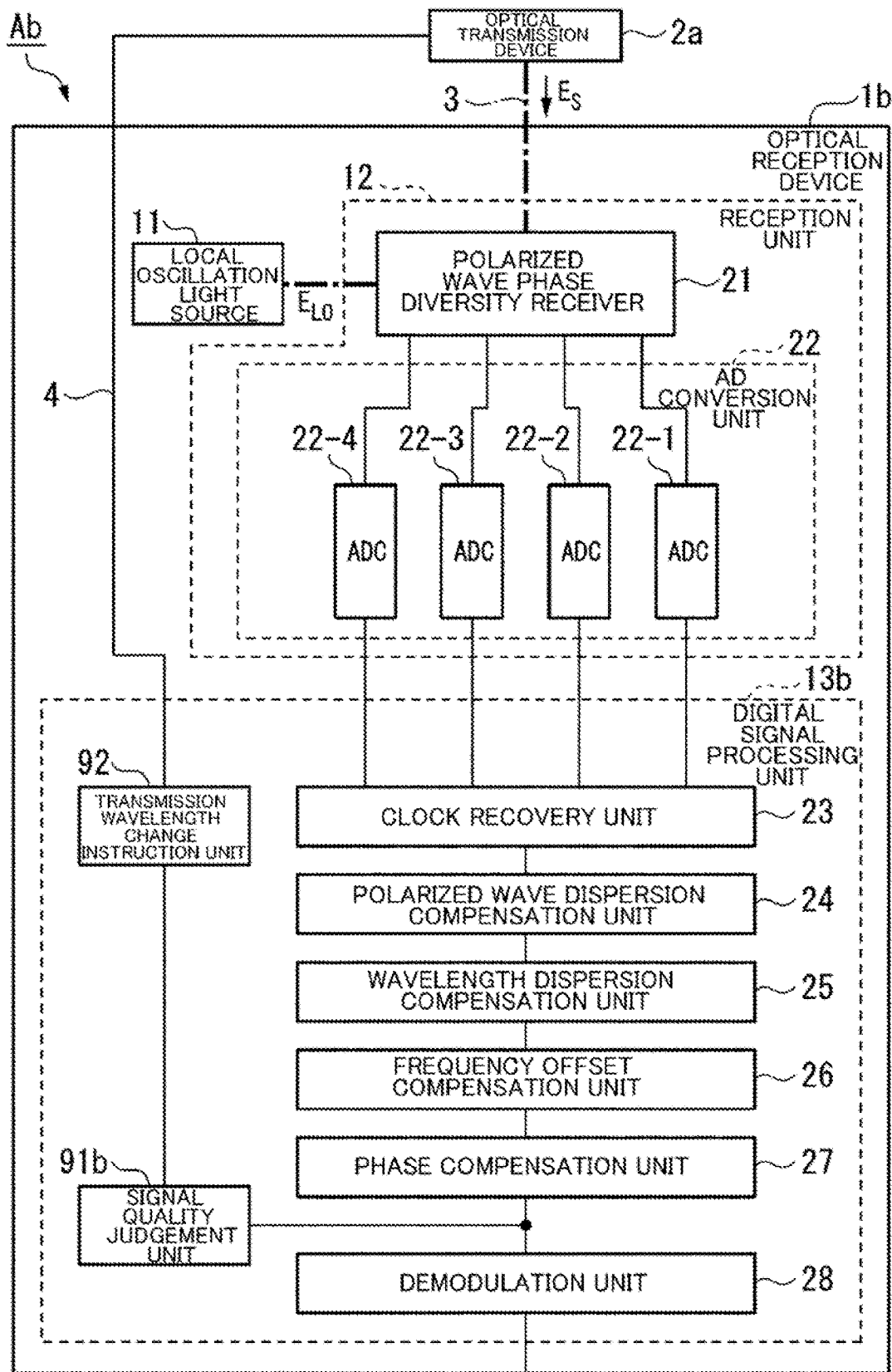
FIG. 15 is a block diagram showing another configuration example of the optical transmission system of the second embodiment.
Figure 16:
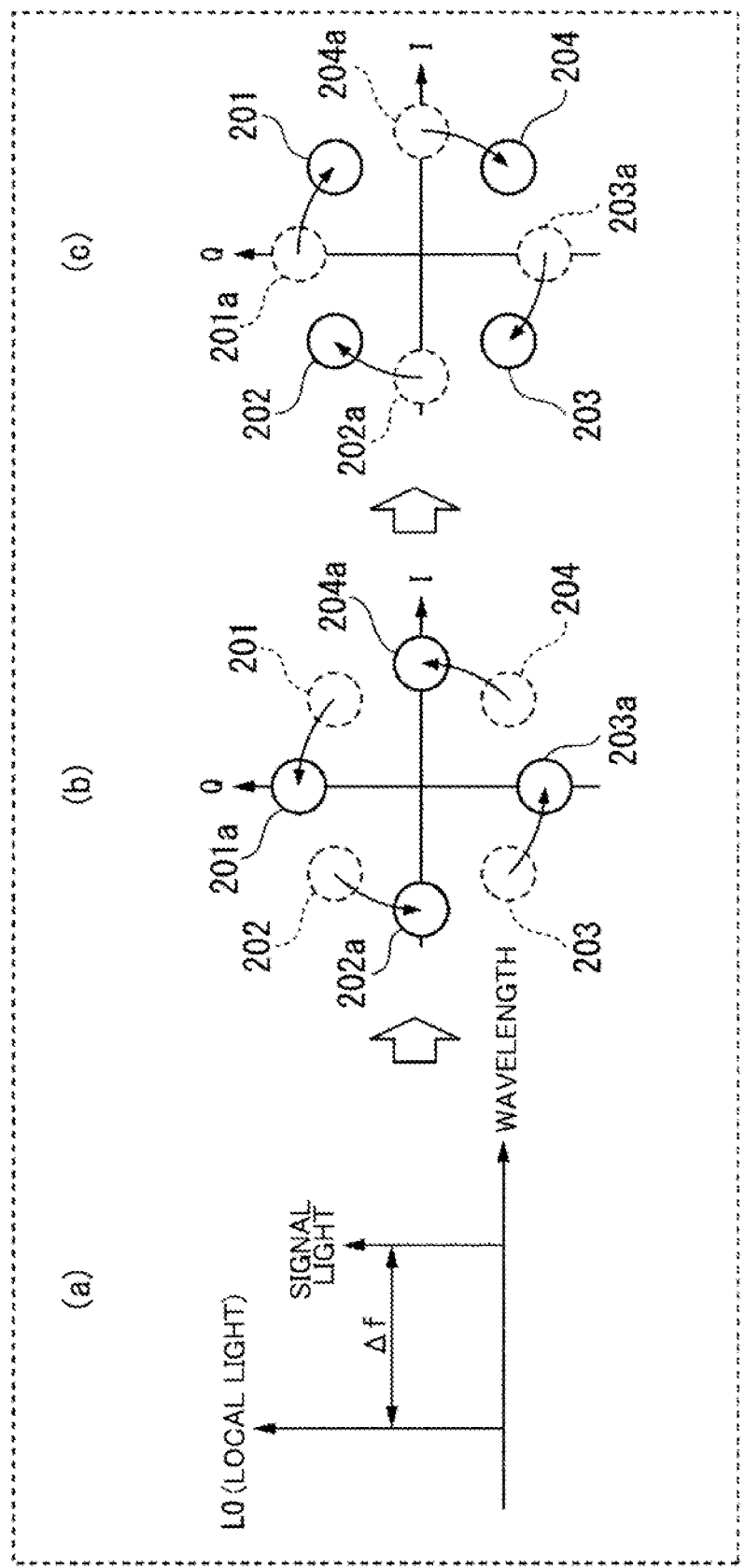
FIG. 16 is a diagram explaining a frequency offset.

FIG. 15 is a block diagram showing a configuration of an optical transmission system Ab as another configuration example of the second embodiment. Note that, also in FIG. 15, the connection line indicated by the dashed line is an optical line through which an optical signal propagates, and other connection lines are an electric line through which an electric signal propagates. In the optical transmission system Ab, the same configurations as those of the optical transmission system A and Aa of the first and second embodiments are designated by the same signs, and only different configurations will be described below.

The optical transmission system Ab includes an optical reception device 1b, an optical transmission device 2a, an optical transmission line 3 that connects the optical reception device 1b and the optical transmission device 2a, and a communication line 4. Note that although the communication line 4 is also shown as an electric line in the optical transmission system Ab, it may be an optical line as in the case of the optical transmission system Aa. The optical reception device 1b includes a local oscillation light source 11, a reception unit 12 and a digital signal processing unit 13b.

The digital signal processing unit 13b includes a clock recovery unit 23, a polarized wave dispersion compensation unit 24, a wavelength dispersion compensation unit 25, a frequency offset compensation unit 26, a phase compensation unit 27, a demodulation unit 28, a signal quality judgement unit 91b, and a transmission wavelength change instruction unit 92.

The signal quality judgement unit 91b is connected to the output side of the phase compensation unit 27, and takes in the digital signal subjected to the phase compensation by the phase compensation unit 27. The signal quality judgement unit 91b calculates an error vector amplitude (hereinafter referred to as "EVM" (Error Vector Magnitude)) on the basis of the digital signal taken in. The signal quality judgement unit 91b judges whether or not the signal quality of the digital signal is deteriorated on the basis of the EVM and a predetermined threshold value by using the calculated EVM as an index indicating the deterioration degree of the signal quality of the digital signal. When it is judged that the signal quality of the digital signal is deteriorated, the signal quality judgement unit 91b outputs the transmission instruction signal to the transmission wavelength change instruction unit 92.

That is, the signal quality judgement unit 91b uses the EVM instead of the residual frequency offset amount $\Delta f_n$ to perform processing similar to steps Sa10 and Sa11 shown in FIG. 13 performed by the signal quality judgement unit 91.

Thus, since the wavelength of the signal light of the optical transmission device 2a can be adjusted in accordance with the quality deterioration of the reception signal even in the optical transmission system Ab which is another configuration example of the second embodiment, in addition to the effect of the optical transmission system A of the first embodiment, the requirement of the frequency stability of the light source used in generating the signal light provided in the optical transmission device 2a can be relaxed, and the cost of the optical transmission device 2a can be reduced.

Note that, in the above-described optical transmission system Ab, the signal quality judgement unit 91b calculates an SNR from the calculated EVM, and judges whether or not the signal quality of the digital signal is deteriorated on the basis of the calculated SNR and a predetermined threshold value for SNR. The signal quality judgement unit 91b may output the judgement result to an external device such as a display device connected to the optical reception device 1b.

Also in the optical transmission system Ab, similarly to the case of the optical transmission system Aa, the optical reception device 1b side may notify the optical transmission device 2a of the change amount of the wavelength having a size corresponding to the size of the EVM.

The signal quality judgement unit 91b calculates an index indicating signal quality other than the EVM on the basis of the digital signal taken in, and may judge, on the basis of the calculated index and a threshold predetermined for the index, whether or not the signal quality of the digital signal is deteriorated.

The signal quality judgement unit 91 of the optical transmission system Aa calculates the EVM from the digital signal subjected to the phase compensation by the phase compensation unit 27 like the signal quality judgement unit 91b of the optical transmission system Ab, and may judge whether or not the signal quality of the digital signal is deteriorated using both the residual frequency offset amounts $\Delta f_n$ and the EVM, or calculates the signal-to-noise ratio from both the residual frequency offset amounts $\Delta f_n$ and the EVM, and may judge whether or not the signal quality of the digital signal is deteriorated based on the calculated signal-to-noise ratio.

In the optical transmission systems A, Aa, and Ab of the first and second embodiments, the optical transmission devices 2 and 2a modulate transmission data by the polarized wave multiplexing QPSK system, but a method other than the polarized wave multiplexing QPSK system, that is, an M-PSK method other than k=2, for example, a B-PSK system or the like may be used for modulation, or a QAM system may be used for modulation. In this case, each of the optical reception devices 1, 1a, and 1b is provided with the reception unit 12 corresponding to the modulation system of the optical transmission devices 2 and 2a facing each other, that is, the reception unit 12 for converting the signal light modulated by the modulation system of the optical transmission devices 2 and 2a into the digital signal.

Although an example in which a system based on differential detection shown in NPL 3 is used as the frequency offset amount estimation unit 31 of the frequency offset compensation unit 26 provided in the optical reception devices 1, 1a, and 1b of the first and second embodiments and the frequency offset amount estimation unit 31 of the residual frequency offset compensation unit 26a provided in the optical reception device 1a has been described above, any system can be used as long as it is a system for estimating the frequency offset amount in a range of –B/2 or more and +B/2 or less, for example, the systems shown in NPL 1 and 2 may be used. However, when a method in which a range of a frequency offset amount which can be estimated is narrower that a range of –B/2 or more and +B/2 or less is used as in the M multiplication shown in the following reference document, the compensated frequency offset amount $\Delta f_c$ does not become an integer multiple of the symbol rate B, the phase rotation is affected, and such a conventional method cannot be used.

[Reference document: Andreas Leven. Noriaki Kaneda. Ut-Va Koc, and Young-Kai Chen, "Frequency Estimation in Intradyne Reception", IEEE PHOTONICS TECHNOLOGY LETTERS, VOL. 19. No. 6, Mar. 15, 2007]

In the first and second embodiments described above, a case in which each of a plurality of symbols included in the training symbol sequence of the digital signal is differentially encoded in advance in the optical transmission device 2 so that the phases of QPSK four-value symbols become one of three phases of $n\pi/2$ (where n=1, 2, and 3) after the differential detection is shown. On the other hand, in NPL 3, an example of differential encoding in which n=±1 or ±2 are satisfied is shown, and in this case, by calculating the sum of the N vectors $A_r(t)$, the modulation component of n=±1 is canceled. Thus, by calculating the vector average of the vector $A_r(t)$ obtained by the differential detection, any differential encoding may be applied to generation of the training symbol sequence as long as the modulation component of the first term can be canceled.

The polarized wave phase diversity receiver 10 provided in the optical reception devices 1, 1a and 1b of the first and second embodiments may be a receiver that performs only polarized wave diversity or a receiver that performs only phase diversity.

Although the optical reception devices 1, 1a and 1b of the first and second embodiments have the frequency offset compensation unit 26 provided at the rear stage of the wavelength dispersion compensation unit 25, the optical reception devices may have the frequency offset compensation unit 26 provided at the front stage of the wavelength dispersion compensation unit 25. The optical reception device 1a may be provided with the frequency offset compensation unit 26 and the residual frequency offset compensation unit 26a at the front stage of the wavelength dispersion compensation unit 25.

In the configuration of the second embodiments described above, in the processing shown in the step Sa11, the determination processing using the inequality with the equal sign is performed. However, the present invention is not limited to this embodiment, and since processing for judging "whether or not . . . equal to or more than" is merely an example, and this processing may be replaced by processing for judging "whether or not . . . exceeds" in accordance with the method for defining a threshold value.

The digital signal processing units 13, 13a, and 13b in the above-described embodiments are realized by a computer. In this case, it may be realized by recording the program for realizing this function on a computer-readable recording medium, read the program recorded in the recording medium into the computer system, and executing. Note that the "computer system" mentioned here includes OS and hardware such as peripheral equipment. In addition, the "computer-readable recording medium" includes a portable medium such as a flexible disc, a magneto-optical disc, a ROM, and a CD-ROM, and a storage device such as a hard disk built in the computer system. Furthermore, the "computer-readable recording medium" may also include a recording medium that dynamically holds a program for a short time period such as a communication wire when the program is to be transmitted via a network such as the Internet or a communication line such as a telephone line as well as a recording medium that holds a program for a certain time period such as a volatile memory inside a computer system serving as a server or a client in that case. Moreover, the program described above may be any of a program for realizing some of the functions described above, a program capable of realizing the functions described above in combination with a program already recorded in the computer system, and a program for realizing the functions by using a programmable logic device such as a Field Programmable Gate Array (FPGA).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The present invention can be applied to an optical reception device that performs frequency offset compensation on a digital signal obtained by digital coherent reception.

REFERENCE SIGNS LIST

1 Optical reception device
2 Optical transmission device
3 Optical transmission line
A Optical transmission system
12 Reception unit
13 Digital signal processing unit
21 Polarized wave phase diversity receiver
22 AD conversion unit
22-1 to 22-4 AIX:
23 Clock recovery unit
24 Polarized wave dispersion compensation unit
25 Wavelength dispersion compensation unit
26 Frequency offset compensation unit
27 Phase compensation unit
28 Demodulation unit

The invention claimed is:

1. An optical reception device comprising:
   a local oscillation light source configured to generate local oscillation light,
   a receiver configured to receive signal light of a symbol rate B generated by optically modulating transmission data, perform digital coherent reception by interfering the received signal light with the local oscillation light generated by the local oscillation light source, convert the signal light into an electric digital signal, and output the digital signal, in which a range of an electric band is in a range from $-Be$ to $+Be$ and $Be > B/2$ is satisfied; and
   a digital signal processor configured to demodulate the transmission data from the digital signal outputted by the receiver, wherein
   the digital signal processor comprises:
   a frequency offset compensator configured to estimate a frequency offset amount generated in the digital signal in a range of $-B/2$ or more and $+B/2$ or less in accordance with a frequency difference between the signal light and the local oscillation light, and perform frequency offset compensation for the digital signal on the basis of the estimated frequency offset amount to compensate the frequency offset amount in the range of $-B/2$ or more and $+B/2$ or less and compensate so as to remain the frequency offset amount of an integral multiple of the symbol rate B when the frequency offset amount is in a range of less than $-B/2$ and a range of more than $+B/2$.

2. The optical reception device according to claim 1, further comprising:
   a signal quality judger configured to detect an index indicating a deterioration degree of signal quality in the digital signal subjected to frequency offset compensation by the frequency offset compensator and judge whether or not the signal quality of the digital signal is deteriorated on the basis of the detected index indicating the deterioration degree of the signal quality and a predetermined threshold value.

3. The optical reception device according to claim 2, wherein
   the digital signal processor comprises:
   a frequency offset amount estimator configured to estimate the frequency offset amount generated in the digital signal subjected to the frequency offset compensation by the frequency offset compensator in the range of $-B/2$ or more and $+B/2$ or less and set the estimated frequency offset amount as a residual frequency offset amount included in the digital signal, and
   the signal quality judger uses the residual frequency offset amount as an index indicating a deterioration degree of the signal quality and judges whether or not the signal quality of the digital signal is deteriorated, or calculates a signal-to-noise ratio from the residual frequency offset amount, uses the calculated signal-to-noise ratio as a deterioration degree of the signal quality and judges whether or not the signal quality of the digital signal is deteriorated.

4. The optical reception device according to claim 2, wherein the digital signal processor comprises:
   a phase compensator configured to detect a phase difference between the signal light and the local oscillation light, and perform phase compensation for the digital signal on the basis of the detected phase difference, and the signal quality judger calculates an error vector amplitude on the basis of the digital signal subjected to the phase compensation by the phase compensator, uses the calculated error vector amplitude as an index indicating a deterioration degree of the signal quality and judges whether or not the signal quality of the digital signal is deteriorated or calculates a signal-to-noise ratio from the error vector amplitude, uses the calculated signal-to-noise ration as a deterioration degree of the signal quality and judges whether or not the signal quality of the digital signal is deteriorated.

5. The optical reception device according to claim 2, further comprising:

a transmission wavelength change instructor configured to transmit an instruction signal instructing an optical transmission device that has transmitted the transmission data to change a wavelength of the signal light when the signal quality judger judges that the signal quality of the digital signal is deteriorated.

6. The optical reception device according to claim 1, wherein the digital signal processor comprises:

a residual frequency offset compensator comprises:

a frequency offset amount estimator configured to estimate the frequency offset amount generated in the digital signal subjected to the frequency offset compensation by the frequency offset compensator in the range of −B/2 or more and +B/2 or less, and set the estimated frequency offset amount as a residual frequency offset amount included in the digital signal; and a compensation processor configured to perform the frequency offset compensation for the digital signal subjected to the frequency offset compensation by the frequency offset compensator based on the residual frequency offset amount.

7. A frequency offset compensation method, comprising:

a step in which a local oscillation light source generates local oscillation light;

a step in which a receiver, in which a range of an electric band is in a range from −Be to +Be and Be>B/2 is satisfied, receives signal light of a symbol rate B generated by optically modulating transmission data, performs digital coherent reception by interfering the received signal light with the local oscillation light generated by the local oscillation light source, converts the signal light into an electric digital signal, and output the digital signal; and a step in which a frequency offset compensator provided in a digital signal processor that demodulates the transmission data from the digital signal outputted by the receiver estimates a frequency offset amount generated in the digital signal in a range of −B/2 or more and +B/2 or less in accordance with a frequency difference between the signal light and the local oscillation light, and perform frequency offset compensation for the digital signal on the basis of the estimated frequency offset amount to compensate the frequency offset amount in the range of −B/2 or more and +B/2 or less and compensate so as to remain the frequency offset amount of an integral multiple of the symbol rate B when the frequency offset amount is in a range of less than −B/2 and a range of more than +B/2.

\* \* \* \* \*